United States Patent [19]

Thornborough et al.

[11] Patent Number: 5,031,209

[45] Date of Patent: Jul. 9, 1991

[54] AUTOMATIC METER READER WITH MICROCOMPUTER CONTROL SYSTEM

[75] Inventors: Raymond J. Thornborough, Menomonee Falls; Donald F. Pridemore, Hartford; Gregory M. Gomez, Wauwatosa; Donald H. Strobel, Cedarburg, all of Wis.

[73] Assignee: Badger Meter, Inc., Milwaukee, Wis.

[21] Appl. No.: 472,612

[22] Filed: Jan. 29, 1990

[51] Int. Cl.[5] .................................. H04M 11/00
[52] U.S. Cl. ................................. 379/107; 379/106
[58] Field of Search ............................. 379/106, 107; 340/870.02; 375/9

[56] References Cited

U.S. PATENT DOCUMENTS 3,872,252  3/1975  Malchman et al. ............... 379/106
4,689,801  8/1987  Nurczyk et al. .................. 375/9
4,866,761  9/1989  Thornborough et al. ........ 379/107

*Primary Examiner*—Jin F. Ng
*Assistant Examiner*—Ahmad F. Matar
*Attorney, Agent, or Firm*—Neuman, Williams, Anderson & Olson

[57] ABSTRACT

An automatic meter reader includes a microprocessor connected through digital logic circuitry and a telephone interface to a metering transducer and a telephone line, to develop modulated signals for reporting of registered meter data and for sampling of received signals to detect a carrier and to effect demodulation and develop control data. A count-down arrangement is used for developing the modulated signals. In sampling received signals, a sample count is developed which is proportional to the duration of one cycle of a received signal and which is compared with stored counts for detection of a carrier and for demodulation. A debounce arrangement is included in the logic circuitry.

38 Claims, 7 Drawing Sheets

Microfiche Appendix Included
(1 Microfiche, 49 Pages)

AUTOMATIC METER READER WITH MICROCOMPUTER CONTROL SYSTEM

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

A microfiche appendix (1 micofiche, 47 pages) is submitted herewith as part of this specification.

BACKGROUND OF THE INVENTION 1. Field of the Invention

This invention relates to an automatic meter reader and more particularly to a meter reader which includes a microcomputer operating to accurately control accumulation of meter data, to implement and control telephone communication with a central station to report meter data and to perform auxiliary functions with a high degree of efficiency and reliability. The reader is very efficient, providing a long operating life from a low voltage battery supply and it uses relatively inexpensive components and is otherwise economically manufacturable. 2. Background of the Prior Art A review of pertinent prior art is contained in an introductory portion of the specification of the Thornborough et al. U.S. Pat. No. 4,817,131 issued Mar. 28, 1989 and in the introductory portion of the specification of the Thornborough et al. U.S. Pat. No. 4,866,761 issued Sept. 12, 1989, the disclosures of which are incorporated by reference. Said Thornborough et al. patents disclose automatic meter reader systems which have a number of highly advantageous features and in which "AMR" units are arranged for connection to customer's telephone lines and for automatic dialing for transmission of meter data to a computer of a utility control center. Each AMR unit is battery-operated and includes a microcomputer which is powered up periodically for a short time interval to store data, determine whether a call to the utility control center should be instituted and to determine whether leakage, tamper or other conditions require an immediate call.

Each AMR unit includes telephone interface and power supply circuitry connected to "tip" and "ring" telephone line terminals and to battery terminals. A modem circuit is provided which is operative as either a modulator or a demodulator and which has an input connected to the tip terminal. When operative as a modulator, the modem circuit responds to digital signals applied on a "TXD" line to send frequency shift modulated signals out on the telephone line. When operative as a demodulator, it detects the existence of a carrier signal on the telephone line to develop a signal on a carrier detect line and, in response to a frequency shift modulated signal on the telephone line, it develops a corresponding digital signal on a "RXD" line. A disabling "squelch" signal is applied to the modem circuit at certain times, through a "SQT" line.

Each AMR unit also includes a dial tone detect circuit which responds to a dial tone signal on the tip terminal to develop a signal on a dial tone line. The dial tone detect circuit as well as the modem circuit require a relatively high current for operation and are energized only in an off-hook condition so that they do not normally draw battery current.

The AMR units as disclosed in said patents include additional circuits which are energized at all times and which register meter pulse and monitor conditions, such circuits having very low current consumption. Such additional circuits include a clock circuit; a wake-up timer circuit which responds to clock pulses applied thereto; a meter pulse counter which responds to meter pulses applied from a meter terminal; a status register circuit which has an input connected to monitor the telephone interface circuit and inputs connected to switches for detection of tamper and freeze conditions; and a reset and power control circuit.

A random access memory portion of the microcomputer is also energized at all times, in both a "sleep" condition and a power-up or active condition. However, other circuits, including the main processing circuitry of the microcomputer and serial input-output circuitry associated therewith, are operative only in the power-up condition which is established periodically for short intervals to store accumulated data, or to make a scheduled report or in response to incoming calls or tamper conditions.

Ordinarily, in the absence of a tamper alarm and except when a scheduled report is due, the microcomputer is operated to the power-up condition periodically, e.g., every 5 minutes, in response to a signal applied from the wake-up timer. The microcomputer then increments a 5 minute interval register, adds the meter count from the preceding 5 minute interval to a total count register, adds counts to or updates time-of-day and peak rate registers, as appropriate, and then returns to the sleep condition.

When a scheduled report is due, the microcomputer initiates an operation in which a signal is applied to establish an off-hook condition and to then wait for a signal from the dial tone detector. Then a pulse-dialing operation is performed to dial a number assigned to the utility control center and the microcomputer then waits for a signal on the carrier detect line from the modem circuit. Then the microcomputer applies a squelch signal to the modem circuit it then proceeds to apply signals through the "TXD" line to the modem circuit to cause the modem circuit to send FSK modulated signals to the utility control center and thereby send data thereto. Then the microcomputer monitors the "RXD" line from the modem circuit, for receipt of an acknowledgement character and data from the utility control center. After data is sent back and forth in this way to effect a complete scheduled report transaction, the microcomputer operates to set the wake-up timer, makes a final phone/tamper check and then returns to the sleep condition.

The systems of said Thornborough et al. patents include a number of other advantageous features as set forth in detail therein.

SUMMARY OF THE INVENTION

This invention was evolved with the general object of providing automatic meter readers which may include advantageous features as disclosed in said Thornborough et al. patents and which are manufacturable at low cost and which have low current consumption and are otherwise highly efficient, while being highly reliable and trouble-free in operation for extended periods of time.

Important features of the invention relate to the discovery and recognition of sources of problems with prior art systems. One problem relates to modem circuits. The modem circuits as used in prior automatic meter readers have included integrated circuit components designed to transmit data using FSK keying at a selected baud rate. Through improved manufacturing techniques, dramatic cost reductions have been made in prior years with respect to such modem components, such that they now seem be quite inexpensive. Nevertheless, the cost is such that they still contribute a substantial portion of the total cost of manufacture of an automatic meter reader.

In accordance with the invention, it is recognized that the prior art modem circuits are designed for general purpose use to operate at various baud rates and to operate with various communication protocols, thereby increasing the complexity and cost of the circuits. In addition, they are designed for operation from the standard 5 volt supply of standard computers, thereby requiring a battery which is substantially more expensive than would otherwise be required.

In accordance with an important feature of the invention, a conventional type of modem is not used. Instead, the microcomputer of the reader is used in conjunction with inexpensive components to perform the functions performed by the conventional modem circuit of the prior meter readers. The cost of the modem circuit is not only avoided but a substantial additional cost reduction and operational advantage is obtained from avoiding the voltage requirements of the prior modem circuits to reduce the cost of the battery. At the same time, the system is highly reliable and trouble-free in operation.

This invention also recognizes that although it is desirable, for facilitating operation at the utility control center, for each reader to transmit and receive FSK signals at standard frequencies and at a standard rate, each reader need transmit and receive at only a single pair or frequencies and at a single rate, thereby facilitating implementation of the modem functions by the microcomputer. The single rate may be 300 baud, for example, which is quite adequate for many applications and the use of a low rate is generally desirable for increased reliability of communications. It will be understood, however, that the invention is not limited to the use of one rate or to a low rate of transmission.

Specific features of the invention include the processing of received signals in a manner such as to facilitate the performance of demodulation functions by the microcomputer, the performance of operations by the microcomputer to achieve demodulation of received signals with a high degree of accuracy of reliability, to operations performed in generation of signals for transmission to the utility control center, and to circuitry and operations which are such as to reduce current consumption to a minimum so as to obtain a long battery life.

Additional important features of the invention relate to performance of a debounce operation using digital techniques which are such as to obtain reliable operation at low cost and with low current consumption.

Further important features of the invention relate to the supervision of a lead line connecting a reader to a transducer, to detect malfunctions which may result from tampering or other causes.

This invention contemplates other objects, features and advantages which will become more fully apparent from the following detailed description taken in conjunction with the accompanying drawings.

DESCRIPTION OF PREFERRED EMBODIMENTS

Figure 1:
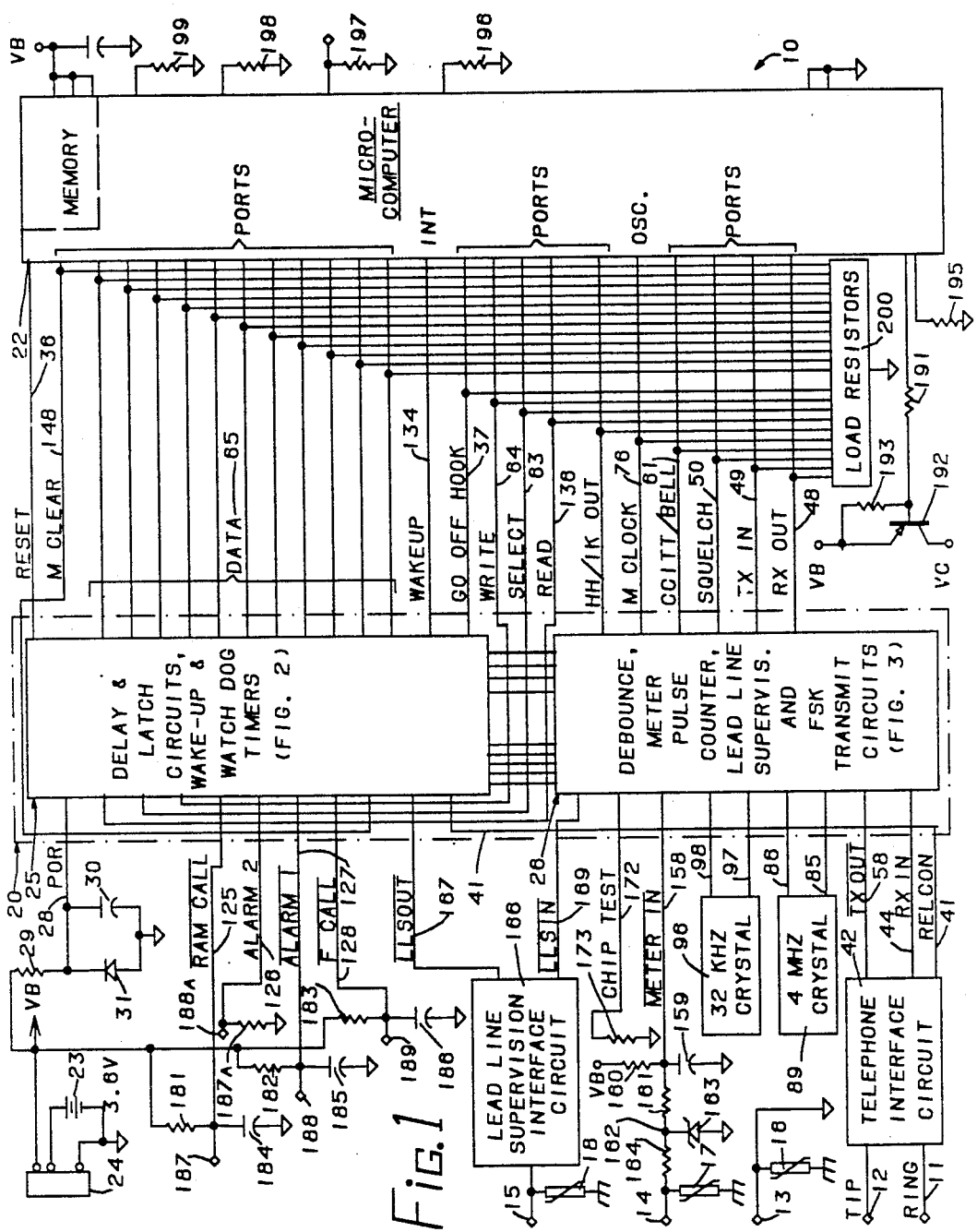
FIG. 1 is a schematic block diagram of an automatic meter reader of the invention.

FIG. 1 is a schematic block diagram of an automatic meter reader which is constructed in accordance with the principles of the invention and which is generally designated by reference numeral 10. The illustrated reader 10 includes "tip" and "ring" terminals 11 and 12 for connection to a telephone line which may typically be a non-dedicated customer's line, for communication with a utility control center to report meter data and to receive data defining the time to a next report. At the utility control center, a computer is provided for processing data received from a large number of readers and at least one call collection module or "CCM" is preferably provided which is ready at all times for telephone communications with the reader 10 for immediately receiving and sending data. Each such CCM may be implemented with a computer separate from that of the utility control center or by using the computer of the utility control center in a manner such that the call collection functions do not interfere with data processing operations performed by the computer of the utility control center.

To obtain meter data, three terminals 13, 14 and 15 are connectable through three conductors of a lead line to a transducer which may be mounted on a gas or water meter, for example, the transducer being operative upon flow of a certain quantity of flow to momentarily provide a very low resistance connection between ground and signal conductors which are connected to the terminals 13 and 14.

An important feature relates to detection of malfunctions such as may result from tampering with the lead line connections between the reader and the transducer. The third conductor of the lead line is a supervision conductor which has one end connected to a terminal 15 of the reader 10 and an opposite end connected through a fixed resistor to the transducer end of the ground conductor of the lead line. As hereinafter described in detail in connection with FIG. 6, malfunctions are detected by monitoring of the impedance between terminal 15 and the signal ground terminal 13 to determine whether it is within normal limits.

Excess voltage protection devices such as metal oxide varistors 16, 17 and 18 are connected between terminals 13, 14 and 15 and a case ground, as indicated diagrammatically.

Operation is controlled through logic circuitry 20 which is controlled by a microcomputer 22 and which is connected to the tip and ring terminals 11 and 12, the transducer terminals 13–15 and other terminals through interface circuits. In a preferred embodiment, the logic circuitry 20 is implemented using a gate array and is so referred to herein. However, it will be understood that some or all of the functions of the circuitry 20 might be implemented without using a gate array as such.

As diagrammatically indicated, the microcomputer 22 has a memory which includes a RAM for temporary storage of data while an operating program as described hereinafter may be permanently stored in a ROM of the computer memory. Both the RAM of the microcomputer 22 and a meter pulse counter of the gate array 20 are continuously supplied with operating current to prevent loss of meter counts and stored data, but both draw very low current. Other circuits draw little or no current. The data processing circuitry of the microcomputer 22 is periodically switched from a sleep mode to a wake-up mode to accumulate meter data and perform other functions, the time of operation during each wake-up being brief so as to reduce current consumption to a minimum.

The reader is operated from a battery 23 which is coupled to a regulator device 24 to supply an operating voltage VB for all circuits of the gate array 20 and for the microcomputer 22. The battery 23 may, for example, be a 3.6 volt lithium battery and the circuits of the invention are designed for reliable operation from the voltage supplied from such a battery and with very low current consumption so as to provide a very long battery life which may be on the order of several years.

Figure 2:
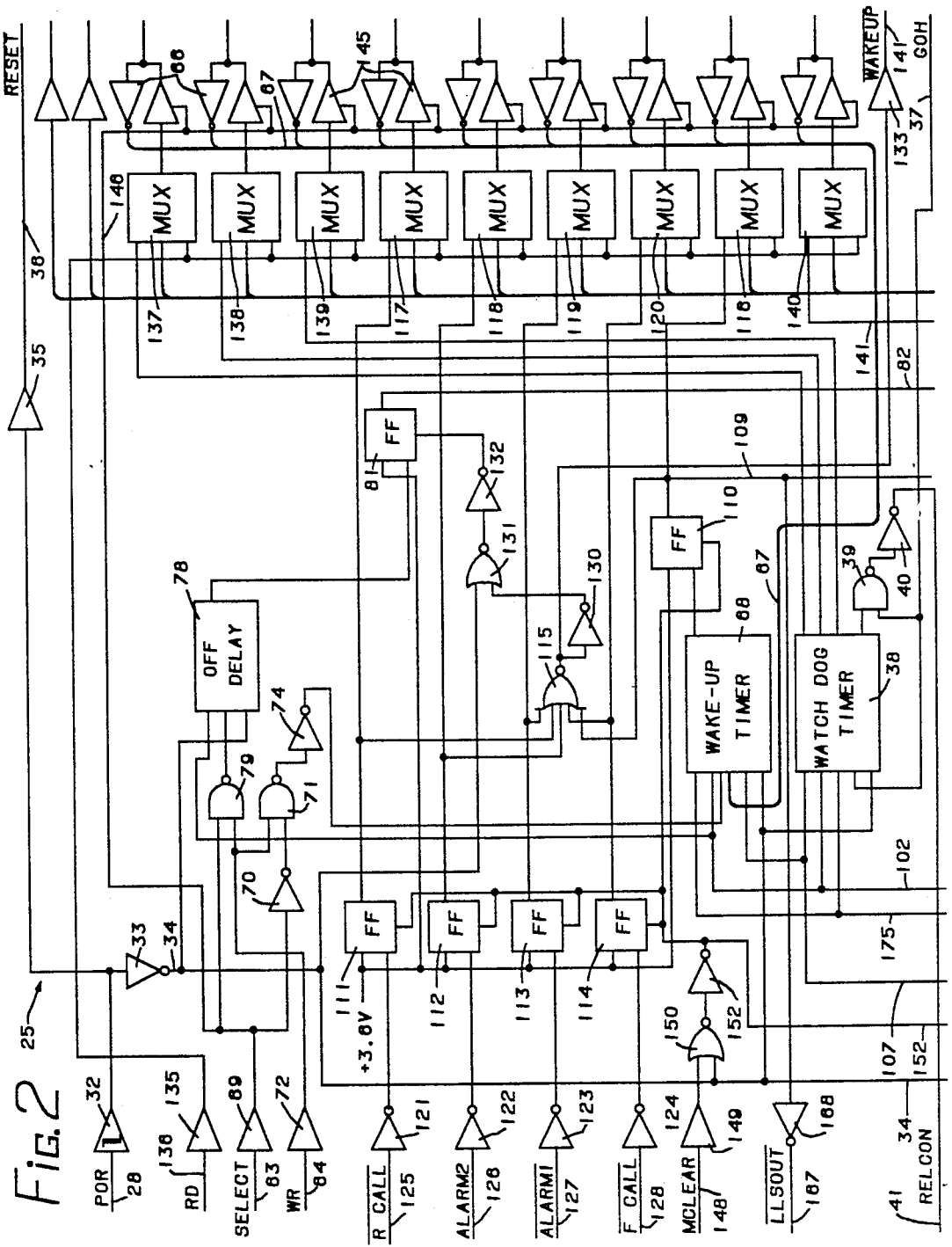
FIG. 2 is a schematic diagram showing an arrangement of wake-up and watch dog timers, oscillator control and latch circuits of the reader of FIG. 1.
Figure 3:
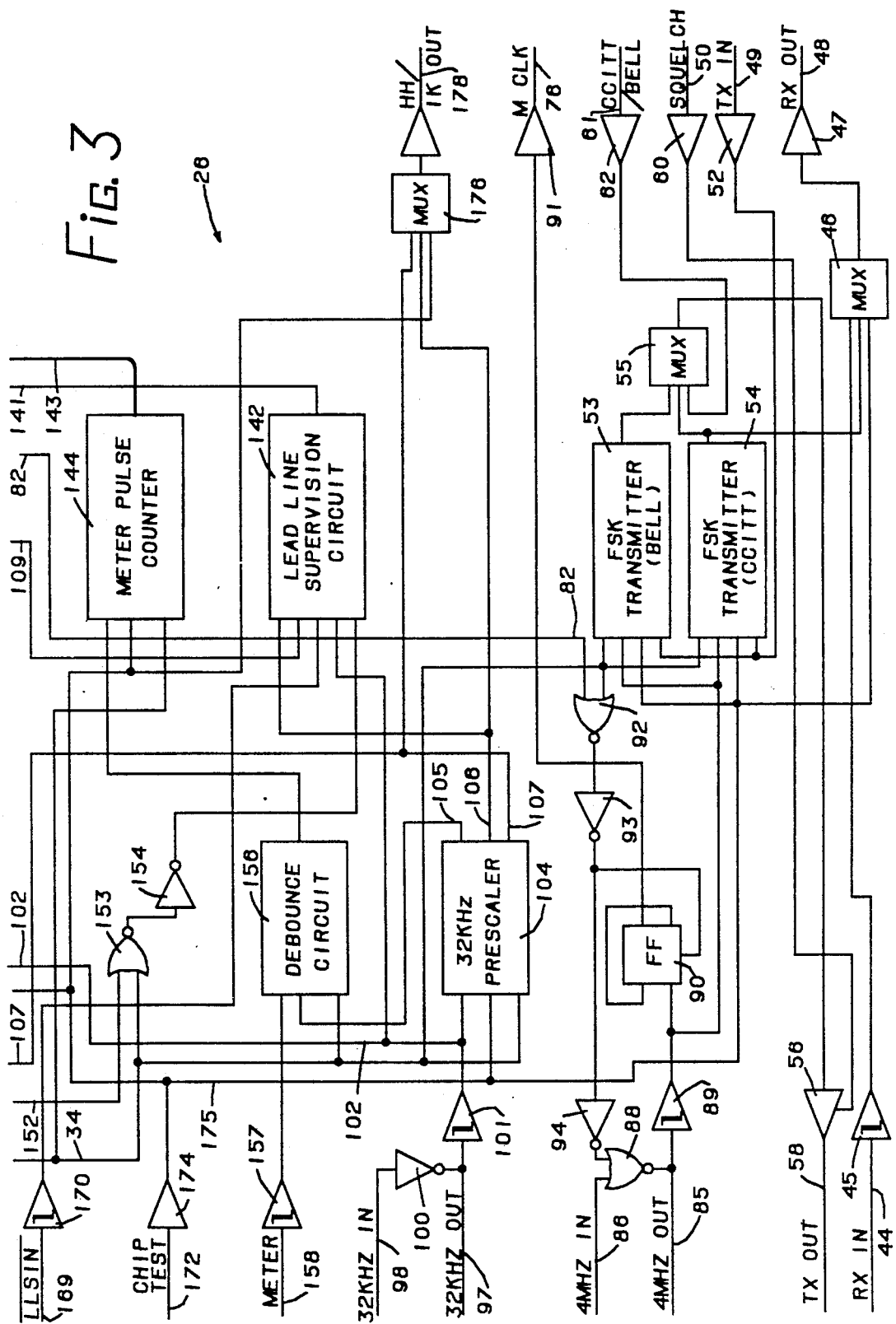
FIG. 3 is a schematic diagram showing an arrangement of debounce, meter pulse counter, lead line supervision and FSK transmitter circuits of the reader of FIG. 1.

The logic circuitry or gate array 20 includes two groups of circuits shown by blocks 25 and 26 in FIG. 1 and shown in detail in FIGS. 2 and 3. The first group, shown in FIG. 2, includes wake-up and watch dog counters, an oscillator control circuit and latch circuits. The second group, shown in FIG. 3 includes debounce, meter pulse counter, lead line supervision and FSK transmitter circuits.

OVERALL OPERATION (FIGS. 1–3)

The general arrangement of the circuitry of the reader and its operation will be best understood by considering the sequence of operation of circuits of circuits of blocks 25 and 26 of the gate array 20, shown in FIGS. 2 and 3 in conjunction with the operation of the operation of interface circuits and the microcomputer 22, shown in FIG. 1.

Upon initial installation of the battery 23, a signal is applied to a power-on-reset or "POR" line 28 which, as shown in FIG. 1, is connected through a resistor 29 to the device 26 and to ground through a capacitor 30 and parallel diode 31. As shown in FIG. 2, the POR line 28 is connected to the input of a Schmitt trigger circuit 32 and, after the capacitor 30 is charged to a certain level, the Schmitt trigger circuit 32 applies a signal through an inverter 33 to a reset line 4 of the gate array 20 to reset circuits connected thereto.

The output of the Schmitt trigger circuit 32 is also applied through a buffer 35 to a reset line 36 for the microcomputer 22 which is supplied with the voltage VB and which is supplied with a clock signal from the gate array 20, as hereinafter described. After an initialization procedure, the microcomputer 22 initializes its RAM, applies initialization signals to the gate array 20 and then applies a "go off hook" signal through a "GOH" line 37 to the gate array 20. As shown in the lower portion of FIG. 2, the GOH line 37 is connected to an input of a watch dog timer 38 the operation of which is described hereinafter. The GOH line 37 is also connected to one input of a NAND gate 39 the output of which is connected through an inverter 40 to a relay control or "RELCON" line 41 which is connected to a telephone interface circuit 42, shown in the lower left portion of FIG. 1.

In response to a signal on the RELCON line 41, a solid state relay of the telephone interface circuit 42 establishes an off-hook low impedance condition between the tip and ring terminals 11 and 12. At this time in the initial installation procedure, a call will have been initiated to connect the reader with the utility control center through the central telephone exchange and an FSK carrier signal will normally be transmitted from the utility control center.

Important features of the invention relate to the detection of the carrier signal as well as frequency shifted and dial tone signals which are transmitted through the interface circuit 42. Such signals are applied through amplifier circuitry in the telephone interface circuit 42 to a receive or RX In line 44 which is connected to the input of a Schmitt trigger circuit 45 as shown in the lower portion of FIG. 3. In response to an applied carrier, a frequency shifted signal or a dial tone signal, circuit 45 operates to develop a corresponding square wave signal which is applied through a multiplexer 46 and a buffer 47 to a "RX OUT" line 48 which is connected to an input port of the microcomputer 22. Through monitoring of the condition of the line 48, in manner as described in detail hereinafter, the microcomputer 22 detects the transmission of an AC signal and determines its frequency.

When, during the initialization procedure, the microcomputer 22 has initialized communications registers and detects a carrier, it then transmits a carrier to the utility control center as an acknowledgement and thereafter operates to receive data from the utility control center, operating through monitoring of the condition of the RX OUT line 48 to detect frequency shifted signals and thereby the transmitted marks and spaces.

To transmit the carrier as an initial acknowledgement, and for later transmission of frequency shifted signals, the microcomputer 22 applies signals to the gate array 20 through a TX IN line 49 and a SQUELCH line 50. As shown in FIG. 3, the TX IN line 49 is connected through a buffer 52 to inputs of two frequency shift signal transmitters 53 and 54 which have outputs connectable through a multiplexer 55 and through a gating buffer 56 to a TX OUT line 58. Line 58 is connected to the telephone interface circuit 42 (FIG. 1), buffer 56 being controlled by a signal applied through a buffer 60 from the SQUELCH line 50. The FSK transmitters 53 and 54 respectively transmit signals in accordance with Bell and CCITT standards, signals therefrom being selectively transmitted through the multiplexer 55 which is controlled by a CCITT/BELL signal applied from the microcomputer 22 through a line 61 and a buffer 62.

The installation procedure is disclosed in detail in a source code listing for the program entered in the ROM of the microcomputer 22. The data received from the utility control center during the procedure includes the telephone number of the utility control center and the next call-in time, for use in automatic call-in procedures as hereinafter described. Once the installation procedure has been successfully completed, the microcomputer 22 sets a flag to indicate that fact, operates to transfer data to the gate array to determine the time of a next subsequent automatic wake-up procedure, and then places itself in a power down or sleep condition.

In placing itself in the power-down or sleep condition, the microcomputer 22 applies signals on "SELECT" and "WRITE" lines 63 and 64, and places data defining the time of the next wake up on eight of a group of eleven data lines which are indicated by reference numeral 65. As shown in FIG. 2, such data lines are connected through inverters 66 to conductors of a data bus 67 which is connected to a wake-up timer 68. The write select signal applied on the SELECT line 63 is applied through a buffer 69 and an inverter 70 to one input of a NAND gate 71 while the write signal is applied through a buffer 72 to the other input of the NAND gate 71. A resultant signal is applied from the output of the NAND gate 71 and through an inverter 74 to a load input of the wake-up timer 68, to load the data applied on data lines 65 into a counter of the wake-up timer 68.

Master clock pulses are applied to the microcomputer 22 through a "M CLOCK" line 76 from circuitry shown in FIG. 3 and described hereinafter. After completing transfer of data to the wake-up timer 68, the application of such master clock pulses is discontinued through the operation of an "OFF DELAY" circuit 78 shown in FIG. 2. Operation of the delay circuit 78 is initiated in response to a control signal applied from the output of a NAND gate 79 which has inputs connected to the outputs of buffers 69 and 72 for the SELECT and WRITE lines 63 and 64. Delay circuit 78 then counts pulses applied at a 32 KHz rate from a line 80 and when a certain count is reached, it applies an output ignal to set a flip-flop 81 which then applies a signal through an "OFF DELAY" line 82 to circuitry shown in FIG. 3 to discontinue application of master clock pulses on line 76.

A high frequency oscillator is provided which is operative at a frequency of 4 MHz in the illustrated embodiment and which operates under control of the signal on the "OFF DELAY" line 82 and through a divide-by-two divider to supply clock pulses at a frequency of 2 MHz to the microcomputer 22 on the "M CLOCK" line 76. In addition, a low frequency oscillator is provided which is operative at a frequency of approximately 32 KHz and which is used for developing timing signals for the gate array.

In particular, a 4 MHz oscillator is formed by a crystal circuit 84 (FIG. 1) which is coupled through lines 85 and 86 to an output and one input of a NOR gate 88 to form an oscillator having an output at the line 85 which is connected through a Schmitt trigger circuit 89 to a set input of a flip-flop 90 and also to inputs of the FSK circuits 53 and 54. The flip-flop 90 is connected to operate as a divide-by-two circuit and its output is connected through a buffer 91 to the "M CLOCK" line to supply 2 MHz clock pulses to the microcomputer 22. For control of the 4 MHz oscillator, the "OFF DELAY" line 82 is connected through a NOR gate 92, and first and second inverters 93 and 94 to a second input of the NOR gate 88, the output of the first inverter 93 being connected to a reset input of the flip-flop 90.

A 32 KHz oscillator is formed by a crystal circuit 96 (FIG. 1) which is coupled through lines 97 and 98 to the output and input of an inverter 100 to form an oscillator having an output at the line 97 which is connected through a Schmitt trigger circuit 101 to a line 102 and to an input of a 32 KHz prescaler circuit 104. Circuit 104 includes divider circuits which operate to develop a 2 KHz output signal on an output line 105, a 1 KHz signal on an output line 106 and a 0.5 or "half" Hz signal on an output line 107.

After data is loaded in the wake-up timer 68 (FIG. 2) and the microcomputer 22 is placed in the power-down or sleep condition, the wake-up counter counts 0.5 Hz timing pulses which are applied through the line 107 from the prescaler circuit 104 (FIG. 3). The wake-up timer 68 counts down from data entered therein until a zero count is reached and then applies a signal to power-up the microcomputer 22, which then operates to make a determination as to whether the power-up resulted from a time-out of the wake-up timer 68 or from another cause and to perform further processing operations in accordance with the cause of the power-up.

In particular, a signal is applied from the wake-up timer 68 to develop an output at a "wake-up" line 109 through triggering of a flip-flop 110 to a set condition, the flip-flop 110 being operative as a latch to allow a read operation to transfer its status to the microcomputer 22. The outpout line 109 of flip-flop 110 and output lines of four other latching flip-flops 111-114 are connected to inputs of a NOR gate 115 and are also connected to inputs of five multiplexers 116-120. The inputs of the latching flip-flops 111-114 are connected to the outputs of four inverters 121-124 having inputs connected to "RAM CALL", "ALARM 2", "ALARM 1" and "F CALL" lines 125-128.

To power-up the microcomputer 22, the output of the NOR gate 115 is connected through an inverter 130, a NOR gate 131 and a second inverter 132 to the reset input of the flip-flop 81 which then removes the signal from the "OFF DELAY" line 82 to allow operation of the 4 MHz oscillator and the application of 2 MHz clock pulses through line 76 to the microcomputer 22. The output of NOR gate 115 is also connected through a buffer 133 and through a "WAKE UP" line 134 to an interrupt input of the microcomputer 22 (FIG. 1).

When the master clock signal and interrupt signals are applied to the microcomputer 22, it performs a wake-up procedure, including a check to determine that the reader is not in a diagnostics mode and that it has been properly installed. Then the microcomputer 22 performs a read operation to effect transfer of data through the data lines 65, to check the status of the gate array and to obtain a count of meter pulses since a last preceding wake-up operation.

In particular, a signal is applied on the select line 63 which is appropriate for a read operation, while applying a signal to a buffer 135 (FIG. 2) through a line 136 to control either a status check or to obtain a meter pulse count. The output of buffer 135 is connected to a multiplexer control line which is connected to control inputs of the multiplexers 116-120 and which is also connected to control inputs of multiplexers 137-140. Multiplexers 137-139 have signal inputs connected to outputs of the watch dog timer 38 while multiplexer 140 has a signal input connected through a line 141 to the output of a lead line supervision circuit 142 (FIG. 3). All of the multiplexers 116-120 and 137-140 also have signal inputs connected through a bus 143 to a meter pulse counter 144, as shown in FIG. 3.

The outputs of all of the multiplexers 116-120 and 137-140 are connected to data lines 65 through buffers 145 which are controlled by a signal on a line 146 which receives the select signal applied from the output of the buffer 69. The operation is such that when an appropriate signal is applied on the line 146, data is transferred through data lines 65 to the microcomputer 22 either from the latching flip-flops 116-120, watch dog timer 38 and lead line supervision circuit 140 or from the meter pulse counter 144, depending upon the state of the read signal applied through the "READ" line 136, buffer 137 and line 138. In one state, a status check is performed. In the other, the meter count is read.

Normally, a status check performed following a wake-up of the microcomputer 22 will show that cause of the wake-up was a time-out of the wake-up timer 68 and a normal wake-up procedure is performed by the microcomputer The normal wake-up procedure includes reloading of the wake-up timer with a count for the next wake-up. The microcomputer 22 applies signals on "SELECT" and "WRITE" lines 63 and 64, and places data defining the time of the next wake up on certain of the data lines 65 to transfer data through inverters 66 to the data bus 67 which is connected to a wake-up timer 68. For example a count of 150 (decimal) may normally be loaded in the counter of the wake-up timer 68, to produce a time-out after 5 minutes with 0.5 Hz pulses applied thereto. A lesser count is loaded in the counter to produce a time-out in a lesser time, as when a scheduled report is to be made.

The normal wake-up procedure also includes the reading of the count of meter pulses since the last previous wake-up and the corresponding update of a meter totalizer. After doing so, a second status check may be made including a check for an output from the lead line supervision circuit 144 and, in the absence of such an output, a recheck of status flags, normally followed by a reset of latching flip-flops 116-120 and the lead line supervision circuit 142 and a switch to the low-power mode or sleep condition.

The power-down operation includes the aforementioned operation of the off-delay circuit 78 to operates in response to signals on the SELECT and WRITE lines 63 and 64 and after a certain delay time period to set the flip-flop 81 and apply a signal through the line 82 to discontinue application of 2 MHz clock pulses through line 76 to the microcomputer 22. During the delay time period, the microcomputer 22 applies a "M CLEAR" signal on a line 148 which is connected through a buffer 149, NOR gate 150 and inverter 151 to a line 152 which is connected to reset inputs of the flip-flops 116-120 and lead line supervision circuit 142, as shown in FIG. 2. As shown in FIG. 3, line 152 is also connected through a NOR gate 153 and an inverter 154 to a reset input of the lead line supervision circuit. It is noted that line 152 is not connected to the meter pulse counter 144 which is reset to a zero count status only from the line 34 on power-up so as to insure against the missing of a meter count which might occur during application of a reset signal to thereto. An effective reset is obtained by supplementing the meter pulse counter 144 of FIG. 3 with a count register which is maintained by the microcomputer 22. In each wake-up, the microcomputer 22 substracts the registered in its count register in the prior-wake up from the current count registered by the counter 141 to determine the count and then stores the current count from counter 144 the count register of the microcomputer 22 for use in the next wake-up.

The meter pulse counter 144 (FIG. 3) has an input connected to the output of a debounce circuit 156 which receives 2 KHz pulses through line 105 from the prescaler circuit 104 and which has an input connected to the output of a Schmitt trigger circuit 157, the input of which is connected to a "METER IN" line 158.

As shown in FIG. 1, line 158 is connected through a capacitor 159 to ground, through a resistor 160 to the "VB" voltage supply line and through a resistor 161 to a circuit point 162 which is connected through a Zener diode 163 to ground and through a resistor 164 to the input terminal 14. As hereinafter described in connection with FIG. 5, the debounce circuit 156 operates digitally to effect a debounce operation and to insure reliable counting of meter pulses.

Another important feature relates to lead line supervision to sense a malfunction of the lead line connection caused, for example, by tampering with the connection between the meter terminals 13 and 14 of the reader 10 and the meter transducer. The lead line supervision circuitry determines whether the impedance between terminal 15 and ground, measured by measuring the change of charge of a capacitor by the such impedance with time after placing the capacitor in an initial charge condition. The capacitor is in an interface circuit 166 which is connected to the terminal 15. Operation is initiated by application of a signal to a "LLS OUT" line 167 which, as shown in FIG. 2, is connected to the output of an inverter 168 with the input of inverter 168 being connected to the wake-up line 109 at the output of the flip-flop 110. The circuit 166 is also connected through a "LLS IN" line 169 and through a Schmitt trigger circuit 170 to an input of the lead line supervision circuit 142, as shown in FIG. 3.

For testing purposes, a "CHIP TEST" line 172 is provided which is connected through a resistor 173 to ground and which is connected through a buffer 174 to a line 175 which is connected to test inputs of various circuits as shown, including a control input of a multiplexer 176 which has inputs connected to the 1 KHz and 0.5 Hz output lines 106 and 107 of the prescaler and which has an output connected through a buffer 177 to an output line 178.

As shown in FIG. 1, the "RAM CALL", "ALARM 1" and "F CALL" lines 125, 127 and 128 are connected through resistors 181, 182 and 183 to the "VB" supply line, through capacitors 184, 185 and 186 to ground and to terminals 187, 188 and 189. The "ALARM 2" line 126 is connected through a resistor 187A to ground and to a terminal 188A.

As is also shown in FIG. 1, the microcomputer 22 includes an output which is connected through a resistor 191 to the base of a transistor 192 having emitter and collector electrodes connected to the "VB" terminal and to a "VC" terminal which is used for supplying an operating voltage to an amplifier in the telephone interface circuit 42, a resistor 193 being connected between the emitter and base electrodes of transistor 192. The microcomputer supplies a signal to the transistor 192 to energize the amplifier of the telephone circuit only as required, and to minimize battery current.

The microcomputer 22 also includes terminals connected through resistors 195-199 to ground. The various input and output ports of the microcomputer 10 are connected to ground through resistors of a block of load resistors 200.

TELEPHONE INTERFACE (FIG. 4)

Figure 4:
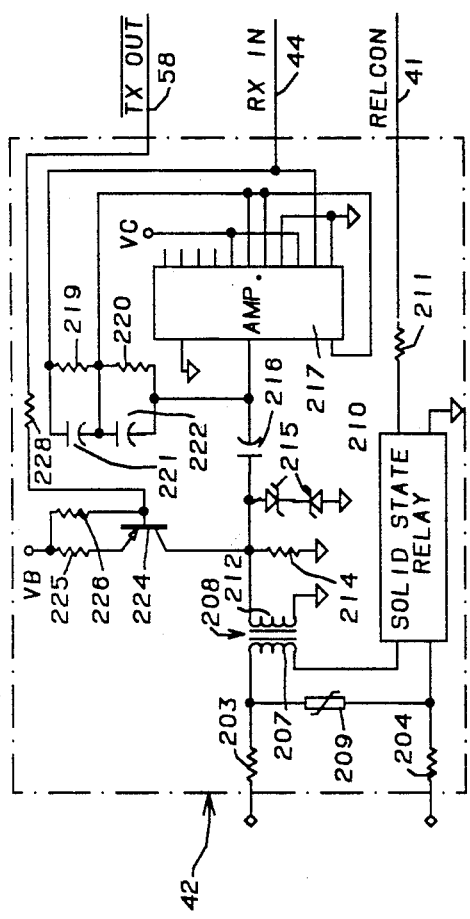
FIG. 4 is a circuit diagram of a telephone interface circuit of the reader of FIG. 1.

FIG. 4 illustrates the telephone interface circuit 42. The tip and ring terminals 11 and 12 are connected through resistors 203 and 204 to circuit points 205 and 206, circuit point 205 being connected through one winding 207 of a an isolation or line transformer 208 to one load control terminal of a solid state relay 210 having a second load control terminal connected to the circuit point 206. The solid state relay 210 is connected through a resistor 211 to the relay control or "RELCON" line 41 to receive a signal for operation to the "OFF HOOK" condition in which the winding 207 is coupled to the tip and ring terminals and in which a low impedance is established between the ring and tip terminals 11 and 12.

A second winding 212 of the isolation transformer 208 is connected between ground and a circuit point 213 which is connected to ground through a resistor 214 and also through a pair of voltage-limiting zener diodes 215. The circuit point 213 is also connected through a capacitor 216 to a terminal of an integrated circuit chip 217 which is operative as an amplifier and which has a terminal connected to the "RX IN" line 44.

As shown, a network of resistors 219 and 220 and capacitors 221 and 222 is connected input, output and intermediate terminals of the chip 217 for controlling the amplification and response characteristics of the chip 217.

For transmitting signals to the utility control center, the circuit point 213 is additionally connected to the collector of a transistor 224 having its emitter connected through a resistor 225 to the "VB" voltage source, a resistor 226 being connected between the voltage source and the base of the transistor 224 which is connected through a resistor 228 to the "TX OUT" line 58.

DEBOUNCE CIRCUIT (FIG. 5)

Figure 5:
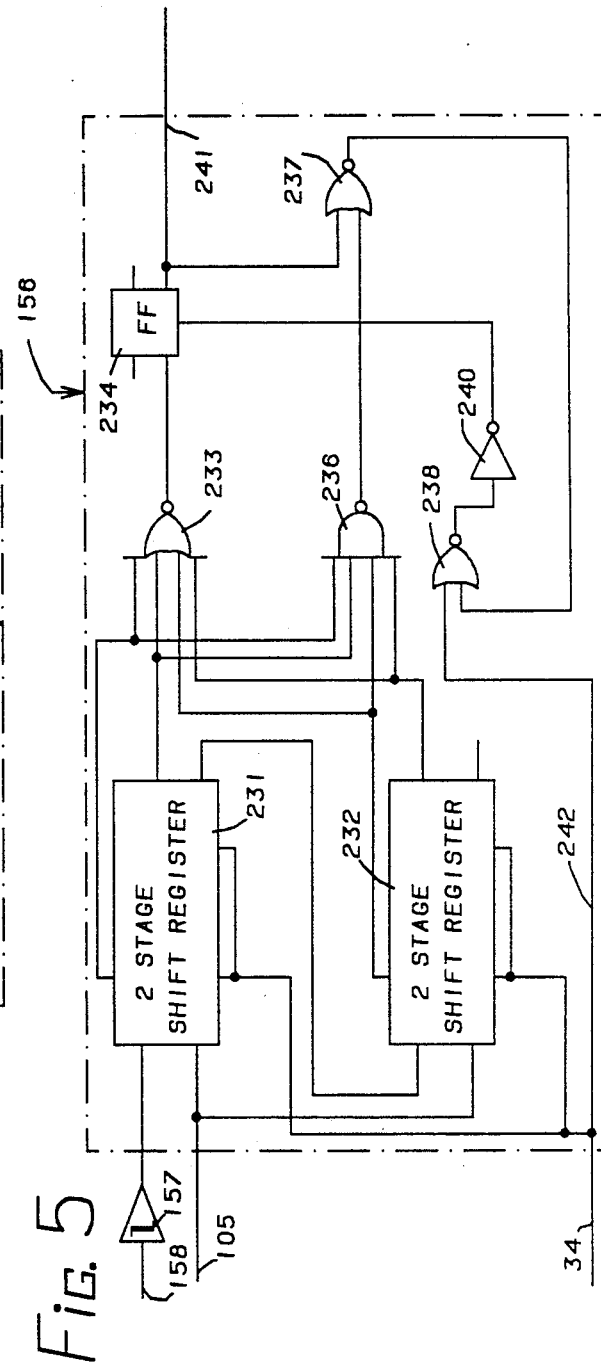
FIG. 5 is a schematic diagram of a debounce circuit of the circuits shown generally in FIG. 3.

FIG. 5 is a schematic diagram of the debounce circuit 156. An incoming signal from the meter transducer, which has a level greater than a threshold value determined by the Schmitt trigger circuit 157, is applied to a two-stage shift register 231, the output of which is applied to a second two-stage register 232. Outputs of the four stages of the two two-stage shift registers 231 and 232 are applied to four inputs of a NOR gate 233 which has an output connected to a set input of a flip flop 234. The same four outputs are applied to inputs of a NAND gate 236 which has an output connected to one input of a NOR gate 237, the output of the NOR gate 237 being connected to one input of a second NOR gate 238, the output of which is connected through an inverter 240 to the reset terminal of the flip flop 234. An output of the flip flop 234 is connected to a second input of the NOR gate 237 and also to an output line 241. A reset line 242 is connected to reset inputs of the four shift register stages and also to a second input of the NOR gate 238.

The four shift register stages are clocked by a 2 KHz clock signal applied thereto from the output line 105 of the prescaler circuit 104. In operation, if the input signal is in a high state for four consecutive clock pulses, the flip flop 234 will be reset to develop a high signal at the output line 241. If, while the flip flop 234 is in a reset condition, the input signal is low for four consecutive clock pulses, the flip flop will be set to develop a low signal at the output line 241. This operation insures that a false output signal will not be produced by transient voltage variations on the input line which have a level less than the threshold level of the Schmitt trigger circuit 157, or which have a duration of less than four clock cycles. The circuit is relatively simple and it operates with low current consumption and inexpensive digital circuitry which can be readily incorporated in a gate array or similar type of integrated circuit. At the same time, the circuit is highly reliable and effective in operation.

LEAD LINE SUPERVISION (FIG. 6)

Figure 6:
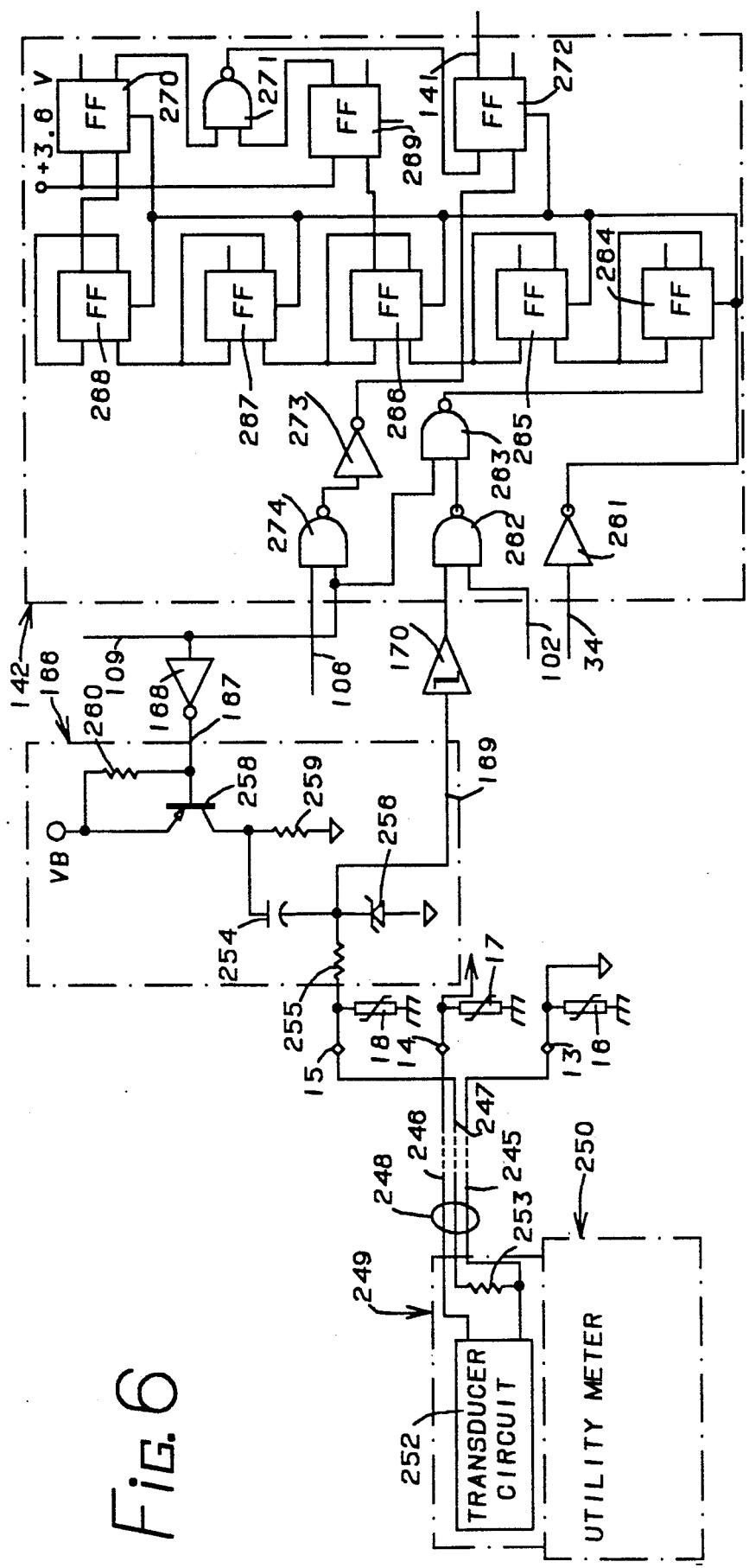
FIG. 6 is a schematic diagram of a line supervision interface circuit of FIG. 1 and its connection through a lead line to a transducer circuit, also showing the logic circuitry of a lead line supervision circuit 142 of FIG. 3.

FIG. 6 is a schematic diagram showing the lead line supervision interface circuit 166 of FIG. 1 and its connection through a lead line to a transducer circuit, also showing the logic circuitry of the lead line supervision circuit 142 of FIG. 3. As diagrammatically shown, the three terminals 13, 14 and 15 are connectable through ground, signal and lead line supervision conductors 245, 246 and 247 of a lead line 248 to a transducer unit 249 which may be mounted on a gas, water or other utility meter 250. The transducer unit includes a transducer circuit 252 which is operative upon flow of a certain quantity of fluid to momentarily provide a very low resistance connection between the ground and signal conductors 245 and 246 which are connected to the terminals 13 and 14. The lead line supervision conductor 247 is connected at one end to the terminal 15 and is connected at an opposite end through a fixed resistor 253 to the transducer end of the ground conductor 245 of the lead line.

Through monitoring of the impedance between terminal 15 and the signal ground terminal 13, it is possible to detect malfunctions of the lead line caused by tampering or other causes.

As aforementioned, the lead line supervision circuitry determines whether the impedance between terminal 15 and ground, measured by measuring the change of charge of a capacitor by such impedance with time after placing the capacitor in an initial charge condition. As shown in FIG. 5, a capacitor 254 has one terminal connected through a resistor 255 to the terminal 15, through a protective zener diode 256 to ground and through the "LLSIN" line 169 to the input of the Schmitt trigger circuit 170. The other terminal of the capacitor 254 is connected to the collector of a PNP transistor 258 and through a resistor 259 to ground. The emitter of the transistor 258 is connected to the "VB" terminal and through a resistor 260 to its base which is connected to the "LLSOUT" line 167.

In operation, the "LLSOUT" line is high at times between the wake up operations, the transistor 258 is non-conductive, the capacitor 254 is discharge through the resistor 259 and diode 256 and the Schmitt trigger circuit 170 is in an initial state. The "LLSOUT" line is brought to a low state in response too a time out of the wake up timer 68 through the inverter 168 connected to the output of the flip-flop 110 (FIG. 2). The potential of the transistor 258 then conducts immediately place the line 169 at a high potential, to trigger the Schmitt trigger circuit 170 to an opposite state and to charge the capacitor 254, initially in a discharge condition, at a rate determined by its capacitance, the value of the resistor 255 and the resistance between terminal 15 and ground.

As the capacitor 254 charges, the potential of the line 169 drops towward ground potential, triggering the Schmitt trigger circuit 170 back to its initial state. Normally, the resistance between terminal 15 and ground is determined by the resistor 253 and the potential of the line drops at a rate within normal limits to trigger the Schmitt trigger circuit 170 to its initial state at time within normal limits. If, however, there is a short between conductors 245 and 247, the capacitor 254 will charge at a rapid rate to rapidly drop the potential of the line 169 and trigger the Schmitt trigger circuit to its initial state at an earlier than normal time or, if either one of the conductors 245 and 247 is cut, the capacitor will charge at a low rate so that the potential of the line 169 will drop at a corresponding low rate and the Schmitt trigger circuit will not be triggered to its initial state until a later than normal time.

The lead line superviion circuit 142 operates to respond to the time of triggering of the Schmitt trigger circuit 170 back to its initial stage and to develop an output signal if the time is either earlier or later than within acceptable limits, to signal that there is either a short or open condition of the lead line. In illustrated embodiment, digital circuits are provided for counting 32 KHz clock pulses to measure the time of triggering of the Schmitt trigger circuit 170.

In particular, a circuit is provided which includes an inverter 261 connected to the reset line 34 and a NAND gate 262 having one input connected to the output of the Schmitt trigger circuit 170 to be switched to an initial high state at wake-up, a second input of NAND gate 262 being connected to receive 32 KHz clock pulses through the line 102. The output of the gate 262 is applied to one input of a second NAND gate 263 which has a second input connected to the wake-up line 109 to be placed in a high state at wake-up. Following wake-up, 32 KHz clock pulses are applied from the output of gate 263 to the input of a counter formed by five flip-flops 234-268. First and second latching flip-flops 268 and 270 are connected to the outputs of the third and fifth counter flip-flop 266 and 268 and have outputs connected to inputs of a NAND gate 271 which has its output connected to a "D" input of an output flip-flop 272. A clock input of the output flip-flop 272 is connected to the output of an inverter 273 which has an input connected to the output of a NAND gate 274 which has inputs connected to the wake-up line 109 and to the 1 KHz output line 106 of the prescaler circuit 102.

In operation, the 1 KHz signal applied through gates 273 and 274 operates to clock the output flip-flop 272 at a sample time occurring after sixteen clock cycles at the 32 KHz rate and output signal is developed at the output of flip-flop 272 if the output of gate 271 is high at the sample time, which will be the case if either the non-inverted output of flip-flop 266 is low or if the inverted output of flip-flop 268 is low. Normally, the number of clock cycles of the signal applied through gates 262 and 263 will be more than four but less than sixteen, so that both inputs of gate 271 will be high and the output thereof will be low at the sample time. However, if the number of cycles of the applied signal is less than four or greater than sixteen, the output of the gate 271 will be high at the sample time either because the non-inverting output of flip-flop 266 will not have been shifted out of an initial low state or because the inverting output of the flip-flop 268 will not have been shifted out of its initial low state.

The values of the components which determine the normal time required to switch the Schmitt trigger circuit 170 back to its initial state, particularly including that of the resistor 253, are such as to produce a time between four and sixteen cycles of the applied 32 KHz clock signal. If due to tampering or from any other cause, the resistance between terminal 15 and ground is changed so as to be substantially lower or higher than the normal resistance, the time measured during the next wake-up operation will be either less than four clock cycles or greater than sixteen and an output signal will be developed at the line 141 and detected during a status check. The microcomputer 22 will then initiate a call to the utility control center to report the condition.

FSK TRANSMITTER 53 (FIG. 7)

Figure 7:
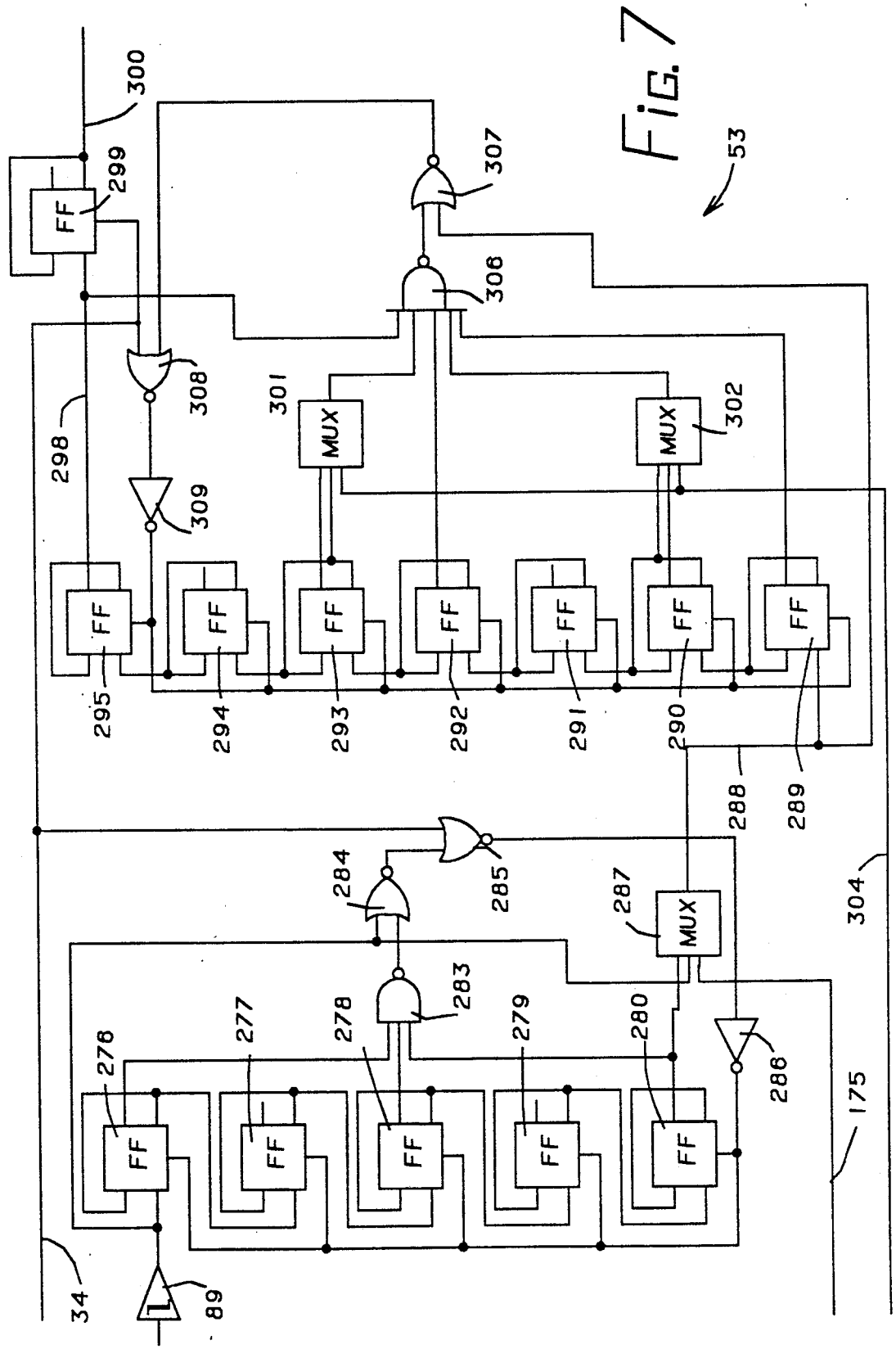
FIG. 7 is a schematic diagram of an FSK transmitter circuit shown generally in FIG. 3.

FIG. 7 shows the frequency shift keying transmitter 53 which is for use in generating signals according to the Bell standard in which a frequency of 1070 Hz represents a space and a frequency of 1270 Hz represents a mark.

The transmitter 53 comprises a chain of five flip-flops 276-280 connected to operate as a divider chain and combined with logic circuitry to effect a reset after 21 applied clock cycles and to develop an output signal at a line 282 connected to the final flip-flop 280. The first flip-flop 276 is supplied with a clock signal at a frequency of 4 MHz from the ouptut of the Schmitt trigger circuit 89 (FIG. 3), so that a frequency of approximately 190,476 KHz is developed at the output line 282.

As shown, the logic circuitry includes a NAND gate 283 having inputs connected to outputs of the flip-flops 276 and 280 and having an output connected through first and second NOR gates 284 and 285 and an inverter 286 to reset inputs of all five flip-flops. The 4 MHz clock signal is applied to a second input of the first NOR gate 284 and also to one input of a multiplexer 286 having a second input connected to the line 282, the multiplexer being controlled by a signal on the chip test line 175 and being provided for test purposes.

The second input of the second NOR gates is connected to the main reset line 34. In normal operation, the 190.476 KHz signal on the line 282 is applied through the multiplexer 286 to a line 288 which is connected to the first flip-flop of a chain of seven flip-flops 289-295, operating as a second divider chain. The second divider chain is connected to logic and control circuitry operative to provide a division ratio of either 89 or 75 to develop a signal on a line 298 which has an approximate frequency of either 2140, or 2540. The signal so developed on line 298 is then applied to a flip-flop 299 which operates as a divide-by-two circuit and which develops a frequency of either 1070 Hz or 1270 at an output line 300 which is applied through the multiplexer 55 and buffer 56 to the "TX OUT" line 58 (FIG. 3).

The logic and control circuitry associated with the second divider chain includes a pair of multiplexers 301 and 302 having control inputs connected to the line 304 which is connectd to the output of the buffer 52 to which the "TX IN" control signal is applied through line 49 (FIG. 3). First and second inputs of the multiplexer 301 are connected to non-inverting and inverting outputs of the flip-flop 293 while first and second inputs of the multiplexer 302 are connected to inverting and non-inverting outpouts of the flip-flop 290.

The outputs of the multiplexers 301 and 302 and outputs of the flip-flops 289, 292 and 295 are connected to inputs of a 5 input NAND gate 306 which is connected through first and second NOR gates 307 and 308 and an inverter 309 to the preset inputs of all seven flip-flops 289-295. Through the operation of such logic circuitry the aforementioned frequency ratios are selectively obtained, depending upon the control signal applied through the line 304.

The circuitry of the FSK transmitter 54 is not shown but it will be understood that it may be constructed in a manner similar to the construction of the transmitter 53 shown in FIG. 7, with divider circuits so arranged and controlled as to develop frequencies of 1180 Hz and 980 Hz as required for a space and a mark, to conform to the "CCITT STANDARD".

WATCHDOG TIMER (FIG. 8)

Figure 8:
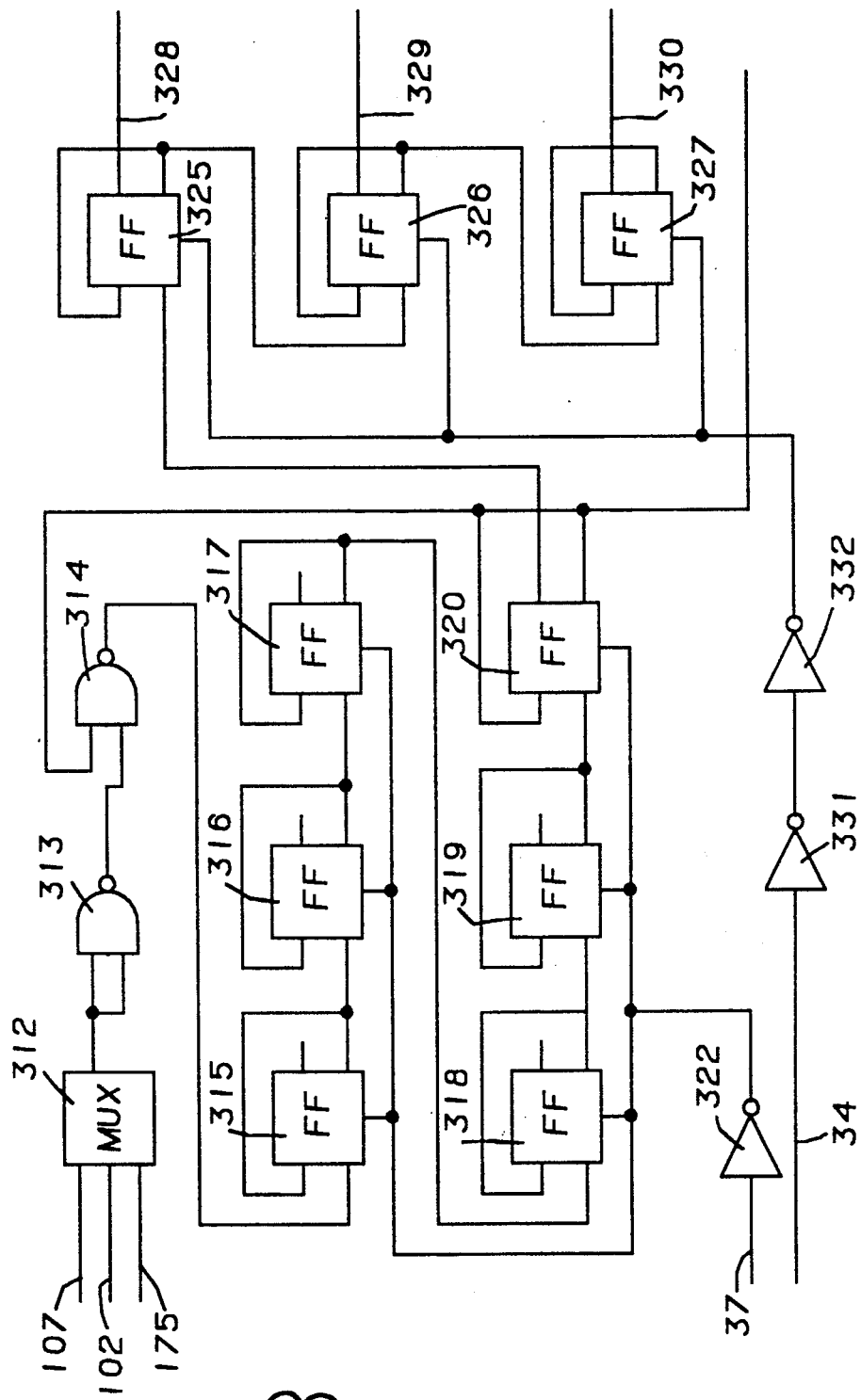
FIG. 8 is a schematic diagram of a watchdog timer circuit shown generally in FIG. 2.

FIG. 8 illustrates the circuit of the watchdog timer 38 which is supplied with a start signal whenever a communication to the utility control center is initiated, to time out and to discontinue the communication operation after certain length of time, for example, after about 60 seconds, substantially longer than is normally required to complete the communication. The purpose is to avoid having the telephone line held indefinitely in an off-hook condition.

The watch dog timer 38 is arranged to receive a 0.5 Hz clock signal through the line 107 which is normally applied through a multiplexer 312 and first and second NAND gates 313 and 314 to the first of a chain of six flip-flops 315-320. For test purposes, however, the chip test signal on line 175 may be applied to the control input of the the multiplexer 312 for application of a 32 KHz clock signal through the line 102.

To initiate operation, a start signal is applied through the line 37 and through an inverter 322 to reset inputs of all six flip-flips 315-320. Then after 32 cycles of the applied 0.5 Hz input signal, the final flip-flop 320 is placed in a set condition an a signal is applied to a second input of the NAND gate 314 to discontinue further application of signals to the chain of flip-flops 315-320. Thus, a delay of 64 seconds is provided, which is normally much more than required to complete a communication, and the final flip-flop 320 will not normally be placed in a set condition.

If, however, flip-flop 320 does become set, a signal is applied through a line 324 to one input of the NAND gate 39 (FIG. 2) to discontinue application of the off-hook signal on the "RELCON" line 41.

Each time that an output signal is developed at the final flip-flop 320, a signal is applied to the first of a group of three flip-flops 325, 326 and 327 operative as an eight digit counter with three output lines 328, 329 and 330 connected to inputs of the multiplexers 137, 138 and 139 (FIG. 2). As shown, the reset line 34 is connected through inverters 331 and 332 to reset inputs of the flip-flops 325, 326 and 327.

The microcomputer 22, in obtaining status information, may thus obtain information as to a number of up to eight unsuccessful attempts at communications, for reporting such information to the utility control center in each communication therewith.

OPERATION OF MICROCOMPUTER 22

The microcomputer 22 used in the illustrated embodiment is a MC68HCL05P microcomputer, of the "6805" series, and a source code listing for the operating program of the microcomputer 22 is included in a Microfiche appendix submitted herewith. The operation of key portions of the operating program are set forth in this specification in the form of flow control listings of operations performed, with jumps or branches and subroutines or called procedures being performed as indicated. It will be understood that if a flow chart format is desired as to any of the floe control listings set forth, a corresponding flow chart can be readily prepared therefrom as well as from the source code listing of the Microfiche appendix.

Important features of the invention relate to communications between the reader and a call collection module (CCM) of the utility control center for the purpose of interchanging data. The illustrated embodiment is arranged for interchange of data and has other operational parameters and features which are outlined as follows:

Data received from the CCM of the utility control center during an Installation:

| | |
|---|---|
| Status Flags | 3 bytes |
| Customer Account Number | 4 bytes |
| Utility Phone Number | 17 bytes |
| Current Meter Reading | 3 bytes |
| CCM Bookkeeping Data | 5 bytes |
| Recall Day Number | 1 bytes |
| Next Call-in Time | 4 bytes |
| Volume Increment Level | 3 bytes |

Data transmitted to the CCM during a Scheduled Transaction:

| | |
|---|---|
| Transaction Identifier | 0.5 bytes |
| Revision Level | 0.5 bytes |
| Customer Account Number | 4 bytes |
| CCM Bookkeeping Data | 5 bytes |
| Status Flags | 3 bytes |
| Current Meter Reading | 3 bytes |
| Previous Meter Reading | 3 bytes |
| # of Call-in Attempts | 1 byte |
| Volume Increment Level | 3 bytes |

Data received from the CCM during a Scheduled Transaction:

| | |
|---|---|
| Status Flags | 3 bytes |
| CCM Bookkeeping Data | 5 bytes |
| Recall Day Number | 1 byte |
| Next Call-in Time | 4 bytes |
| Volume Increment Level | 3 bytes |

Data programmable only during Installation Transaction:
Customer Account Number
Current Meter Reading
Data programmable during any type of Transaction:
Utility Phone Number
CCM Bookkeeping Data
Recall Day Number
Next Call-in Time
Volume Increment Level
Status Flags A one-byte checksum is calculated for every record that is transmitted or received to/from the CCM to insure the integrity of each transaction Data from the CCM is received in a string and stored in dedicated Ram locatiions:
3 Programmable Call-in modes:
  Based on time: (4 time modes)

daily
weekly
monthly
quarterly
Based on an increment in Volume, with auto
Monthly call-in When a call-in attempt is blocked for whatever reason, the reader will go on a retry schedule of 12 hours, 24 hours, 24 hours, 24 hours, 12 hours from the initial call-in attempt.

Types of call-ins from AMR include: (All have different transaction identifiers)
Scheduled Transactions (Call-ins on Time)
Emergency Transactions:
    Miscellaneous Alarm #1 (resets VIL)
    Miscellaneous Alarm #2
    Miscellaneous Alarm #3
    Miscellaneous Alarm #4
Call-in Test: (For call-in testing in the field)
Ram Test Call-in: (microcomputer 22 downloads Ram)

Dial tone detect is a 2 second monitor of the telephone line with a frequency of between 100 Hz and 800 Hz producing a valid dial tone response.
Pulse dialing scheme of:
Speed: 10 pulses/second
Pulse ratio: 40% on/60% off
Interdigit delay: 700 milliseconds 99% of the time the microcomputer 22 will be in the Stop mode to conserve current. The maximum current allowed for the processor in the stop mode is 10 microamps.

After the initial install, the gate array controls when the processor is awake. To bring the processor out of the stop mode, the gate array will issue a low to the interrupt line of the processor. The processor, whenever it is interrupted by the gate array, will check the status flags of the gate array to determine the cause of the interrupt:
5 minute timer timeout
Miscellaneous Alarm #1 (Issue Call-in)
Miscellaneous Alarm #2 (Issue Call-in)
Emergency Test Call-in (Issue Call-in)
Ram Test Call-in (Issue Call-in)
Note: Lead-line supervision is checked during the 5 minute wakeup.

Important features of the invention relate to operations performed in demodulating signals received from the utility control center, and the timing characteristics and formats for receiving are particularly important in understanding such operations. The timing characteristics are directly determined by the frequency of the signal applied through line 76 to the oscillator input of the microcomputer 22 and which is 2 MHz in the illustrated embodiment, being produced by the divide-by-two flip-flop 90 in the gate array 20 from a 4 MHz oscillator signal. The frequency of the signal applied to the microcomputer 22 is then divided by two within the microcomputer 22 to produce an internal processor clock. Thus, the internal processor clock speed is 1.00 MHz, and one instruction cycle is then 1.00 microseconds. All delays within the receiver are based on this 1.00 microseconds instruction cycle timing.

The microcomputer 22 includes a 16-bit free-running counter which is driven by the 1 MHz internal processor to operate as a divide-by-four circuit and to provide a 250 KHz clock. Therefore every number represents 4 microseconds, as far as the free-running counter is concerned.

RECEIVING COMMUNICATIONS FROM CCM

Communications in the illustrated embodiment take place at 300 baud (bits/second) and data is sent and received LSB first.
The format is:
(1 start bit)
(8 data bits) for 1 byte of data
(1 stop bit)

The reader 10 is selectively operable for reception, as well as for transmission, in accordance with either the Bell 103 or the CCITT standards, values for the Bell 103 standard being used as an illustrative example. The following apply when the reader is in the originate mode for a standard Bell 103 communication:
Receive at
  2225 Hz = mark
  2025 Hz = space
Mark: (2225 Hz = 449.4 microsecs.) = 112.35 timer cycles
Space: (2025 Hz = 494.8 microsecs.) = 123.45 timer cycles
300 bits/sec. = 3.33 msec./bit = 3333 microsec./bit
# of samples possible for space = 6.75 samples
# of samples possible for space = 7.42 samples In operation, the reader divides the 300 baud signal into 7 segments per bit; of the 7 segments there are 3 samples taken, and the best 2 out of 3 determine the value of the bit.

One segment of the seven is 476 microsec.

```
    ┌─1 2 3 4 5 6 7─┐
────┘               └──── (1 bit of info)
```

0–476 = segment #1 = delay period #1
476–954 = segment #2 = sample #1
954–1428 = segment #3 = delay period #2
1428–1904 = segment #4 = sample #2
1904–2380 = segment #5 = delay period #3
2380–2856 = segment #6 = sample #3
2856–3332 = segment #7 = delay period #4

Segments #2, 4, 6 are the actual samples checked for a mark or space.

For determining whether a single sample indicates a mark or a space, the number in the 16-bit free-running counter of the microcomputer 22 is captured when there is a change of state (low—high or high—low) at PIN 36 of the microcomputer 22, connected to line 48 (FIG. 1). The number in the 16-bit timer is again captured at the conclusion of one square-wave (SQW) at PIN 36. The first number captured represents the start time, and the 2nd represents the stop time. The start time is then substracted from the stop time. If the number from this subtraction is greater than 117 (decimal), then the sample is a space, else the sample is a mark.

A mark or space is determined from the three samples in the following manner:
1. If the samples are of a start bit:
  3 spaces + 0 marks = space
  2 spaces + 1 mark = mark
  1 spaces + 2 marks = mark
  0 spaces + 3 marks = mark
2. If the samples are of a stop bit:
  3 spaces + 0 marks = space
  2 spaces + 1 mark = space
  1 space + 2 marks = space
  0 spaces + 3 marks = mark 3. If the samples are of a data bit:
   3 spaces + 0 marks = space
   2 spaces + 1 mark = space
   1 space + 2 marks = mark
   0 spaces + 3 marks = mark In the source code of the operating program and in references to various operations hereinafter, the following names are used for various routines which are used in receiving data:

1. GEBOD: Get Eight Bits of Data
2. RECTM: Time to Receive one byte of data
3. GTCD: Begin Timer Countdown on the first edge seen for a sample
4. CAE: Catch an Edge of the signal and determine whether the sample of data was a mark or a space
5. GTS: Go through CAE three times to get three samples/bit in order to determine the state of the of the bit
6. TOOT: Two out of Three determines by the greater than principle the correct frequency of the signal
7. DELAY: A multiple of 10 microSec delay. Uses the DEFAC register
8. CFC: Check for Carrier: Carrier must be recognized for 20 continuous samples of data before a start bit will be accepted.

FLOW CONTROL FOR ROUTINE TO CATCH AND EDGE

The routine called CATCH AN EDGE (CAE) is used in detecting a carrier and then in receiving start, data and stop bits of transmitted characters. In operation, it detects either a rising or fallin signal on PIN 7 PORTD (PIN 36) of the microcomputer 22 which is connected to line 48 (FIG. 1). It then collects one sample of data (1 full SQW) and measures its duration. It returns a number (#) corresponding to the sample duration and also stores either a "0" or a "1" in a bit 0 of a "DATS" register to indicate either a space or a mark. The CAE routine is as follows:

1. Wait for a change of state on PIN 36 (7,PORTD) or line 48, FIG. 1, of the microcomputer 22. Monitor line.
2. If there is no change of state on PIN 36 (7,PORTD), then go to 1. If change occurs (1 to 0) or (0 to 11) go to 3.
3. Capture the present reading of the microcomputer's 16-bit timer (get start time of cycle).
4. Wait for a change of state on PIN 36 (7,PORTD) of the microcomputer.
5. If no change go to 4. If change occurs, go to 6.
6. Wait for a change of state on PIN 36 (7,PORTD) of the microcomputer.
7. If no change, go to 6. If change occurs, go to 8. NOTE: This makes a complete cycle of the square wave input for one sample of data.
8. Capture the present reading of the microcomputer's 16-bit timer (get stop time of cycle).
9. Calculate the time it took to receive one sample (1 full cycle of the SQW). (stop time - start time)
10. Compare the calculated time to the fixed value (hex 73); which would mean the SQW input = 2125 (NOTE: space = 2025, mark = 2225). If calculated time > or = hex 73; sample = space. If calculated time < hex 73; sample = mark
11. Store "0" for space or "1" for mark in bit 0 of the DATS register.

FLOW CONTROL FOR THE CARRIER DETECT ROUTINE

This Routine is called CFC and it uses the "CATCH AND EDGE" or CAE routine. The routine is as follows:

1. Set a counter for the # of consecutive square wave cycles needed of carrier for carrier to be detected.
2. Jump to the routine to catch an edge (CAE) which collects one sample of data (1 full SQW) and returns a number (#) corresponding to the sample duration, representing the time that it took for one SQW cycle to occur at PIN 36, connected to line 48 (FIG. 1).
3. Compare the # received from the CAE subroutine to a first fixed reference # corresponding to the lowest acceptable frequency.
4. If # < fixed, go to 1 If # > or = fixed, go to 5
5. Compare the # received from the CAE subroutine to a second fixed reference # corresponding to the highest acceptable frequency. (In the program, branches are made to use first and second fixed reference #'s in steps 3 and 5 which are set in accordance with whether Bell or CCITT standards are used and in accordance with the optimum sensitivity of the carrier detect).
6. If # > fixed, go to 1 If # < or = fixed, go to 7
7. Decrement the counter for the # of consecutive square wave cycles needed of carrier for carrier to be detected.
8. If counter = 0, go to 9 If counter <> 0, go to 2 9. Valid carrier exists. Therefore, return to main communications program.

FLOW CONTROL FOR THE MAIN RECEIVER ROUTINE

As has been indicated this routine, in the illustrated embodiment, uses 300 Baud Communications w/1 Start Bit, 8 Data Bits, 1 Stop Bit. The Routine is called RTLC and is as follows:

1. (Clear) Reset the Communications Buffer.
2. (Clear) Reset the calculated checksum (checksm = 00) and get the # of bytes to be received and store in (LOR) length of record register.
3. Reset the Watchdog Timer:
   (If this is not reset after each byte is received, an interrupt will be generated by the internal timer circuitry. The unit will end communications and go into stop mode). (Watchdog Timer = 2 secs.)
4. (JSR BTCD) Look for the begin of a start bit:
   (get one [cycle] sample of the square wave at PIN 36 on the microcomputer, then calculate what the frequency of the signal is.) (mark = 2225 Hz = 1) (space = 2025 Hz = 0)
5. Check if received signal was a mark or space. If 0, DATS = 0, go to 6 (signal = space) If 0, DATS = 1, go to 4 (signal = mark)
6. (JSR GTS) Get 3 (cycles) samples of the square wave at PIN 36.
7. Check if all 3 samples are spaces (0). If 4, DATS = 1, go to 4 (at least 1 sample = mark) If 4, DATS = 0, go to 8 (all 3 samples = space)
8. (JSR RECTM) Calculate the time it took to receive the start bit.
9. (JSR GDF) Calculate a delay factor to keep communications within the 300 baud time frame. (delay factor = DEFAC)

10. Delay for (10 microsec. times DEFAC), in order to keep 300 baud.
11. (JSR GEBOD) Receive 8 bits of data and a stop bit.
12. Put byte from the temporary receiver register (RBOD) into the communications buffer (SCIR, X). X indexes the SCIR buffer.
13. Check if that was the last byte to be received. If LOR = X, go to 14 (last byte) If LOR <> X, go to 14 (not last byte)
14. Add the received byte to the checksum. (CHECKSM = CHECKSM+SCIR,X)
15. Increment to the next location of the communications buffer (SCIR) by increasing X by 1.
16. Go to 3 (next byte)
17. Turn off the Watchdog Timer.
18. (Reset) Clear the control status flags used during receive communications.
19. Return to main routine.

FLOW CONTROL FOR RECEIVING EIGHT 8 DATA AND 1 STOP BIT

This Routine is used in the Main Receiver Routine after a Start Bit Has Been Detected and is called GEBOD. The routine is as follows:

1. Set a countdown register to 8 for # of bits to receive (# of bits to receive counter).
2. Capture the present reading of the microcomputer's 16-bit timer (get a start time).
3. Get three samples of data (square waves).
   If calculated square waves > or = 2125 Hz., The sample = 1 = mark
   If calculated SQW < 2125 Hz., Sample = 0 = space
   Store the data sampls in
   0, DATS
   1, DATS
   2, DATS
   a. Capture the present reading of the microcomputer's 16-bit timer (get a stop time).
   b. Calculate the time it took to receive the 3 samples of data (stop time - start time).
   c. Based on this calculated time, delay to stay within the 300 baud limits for safe communications.
4. Make room to store the received bit by shifting the RBOD register one bit to the right. (Therefore, with 8 bits being received, there will be 8 shifts of the RBOD register, and one full byte of received data will be stored in RBOD register.)
5. A best 2 out of 3 scheme is used; therefore:
   If 2 of the data samples received = 0store 0 in 7,RBOD.
   If 2 of the data samples received = 1, store 1 in 7, RBOD.
6. Decrement bit counter.
7. If bit counter = 0, go to 8. Else, go to 2.
8. Return to the main receiver routine (RTLC).

FLOW CONTROL FOR DIAL TONE DETECT FUNCTIONS

This routine is used in a Sheduled or Emergency Communications Routine as hereinafter set forth and is called DTDR. The routine is as follows:

1. Load a down counter for the # of cycles dial tone must be present to issue a pass to the main routine.
2. Wait for a change of state on PIN 36 (7,PORTD) of the microcomputer. (Monitor receive line.) 3. If no change of state on PIN 36 (7,PORTD), then go to 2. If change occurs (1 to 0) or (0 to 1) go to 4.
4. Capture the present reading of the microcomputer's free-running 16-bit count (start time).
5. Wait for a change of state on PIN 36 (7, PORTD) of the microcomputer.
6. If no change, go to 5. If change occurs, go to 7. NOTE: This makes a complete cycle of the square wave input for one sample of data.
7. Capture the present reading of the microcomputer's free-running 16-bit counter (stop time).
8. Calculate the time it took to receive one sample (1 full cycle). (stop time - start time)
9. Compare to the calculated time (found in step 8) to two fixed extremes.
10. For calculated time: If FL < or = CT < or =FH go to 11 If CT < or = FL < or = FH go to 1 If FL < or = FH < or = CT go to 1 where, FL = a fixed low time (for 800 Hz) CT = calculated time (for SQW input) FH = a fixed high time (for 100 Hz) Dial tone is accepted for frequencies between 100 Hz and 800 Hz
11. Decrement the down counter.
12. If down counter = 0, go to 13 If down counter <> 0, go to 2.

FLOW CONTROL FOR (CSRT) COLD START ROUTINE

This Routine is Accessed When Initial Power (Battery) is Applied to the Board.

1. Set the external interrupt flag (deactivate).
2. Reset the stack pointer (put to bottom of the stack).
3. Check if unit already installed and reset occurred from a transient on the reset line. If reset occurred: STUP0 = #$55 STUP1 = #$AA 4. If unit previously installed, go to 5. If unit not installed, go to 6.
5. Put AMR board into low-power stop mode.
6. Reset all RAM locations to 00.
7. Delay 25 seconds.
8. Pre-set alarm conditions to make sure alarms are in a non-active state during installation.
9. Set up the microcomputer port lines.
10. Check if (AMR) unit is attached to the functional tester.
11. If unit not attached to functional tester, (7,PORTC = 0), go to 13. If unit is attached to functional tester, (7,PORTC = 1), go to 12.
12. Go to diagnostics routine.
13. Bring the AMR off hook (BSET 4,PORTB).
14. Go to the installation routine.
15. Bring the AMR on hook (BCLR 4,PORTB). Squelch the transmitter (BCLR 5,PORTB).
16. If installation was successful (7,CNG = 1), go to 18. If installation was not successful (7,CNG = 0), go to 17.
17. Put AMR and microcomputer in the lower-power stop mode.
18. Load the gate array timer with (NXTC+0) number of 2 sec. intervals to first wake up.
19. If AMR set for volume mode, go to 20. If AMR set for time mode, go to 22.
20. Set the previous mode flag to volume (5,PAC = 1).
21. Go to 23.
22. Set the previous mode flag to time mode (5,PAC = 0).
23. Clear alarm flags (conditions).

24. Set flag (1,CTRL = 1) for unit to make a scheduled call-in on 1st wake up.
25. Put unit into an installed condition. A. STUP0 = #$55 (Hex) B. STUP1 = #$AA (Hex) 26. Put AMR and microcomputer in the low-power stop mode.

FLOW CONTROL FOR RETRY ALGORITHM (RETRY)

1. If recall day # (RDR) <> 0, go to 6. If recall day # (RDR) = 0, go to 2.
2. Clear (NXTC+1) high byte of # of 5-min. wake ups until call in.
3. Clear (NXTC+2) low byte of # of 5-min. wake ups until call in.
4. Put 150 into the register for # of 2-second intervals until next wake up. (NXTC+0 = 150 ) This would = 5 minutes.
5. Go to 16.
6. If AMR is on 1st retry attempt (0,NRTRY = 1), go to 9. If AMR is not on 1st retry attempt (0,NRTRY = 0), go to 7.
7. If AMR is on 2nd-4th retry attempts (1,NRTRY = 1) or (2,NRTRY = 1), or (3,NRTRY = 1), go to 12. If AMR is not on 2nd-4th retry attempts (1,NRTRY = 0) and (2,NRTRY = 0), and (3,NRTRY = 0), go to 8.
8. Go to 14, unit is on recall.
9. Clear high byte (NXTC+1) of # of 5-minute wake ups until call in.
10. Put 144 into the low byte (NXTC+2) of # of 5-minute wake ups until call in (NXTC+2 = 144). This would = 12 hours.
11. Go to 15.
12. Put 1 into the high byte (NXTC+1) of # of 5-minute wake ups until call in. Put 32 into the low byte (NXTC+2) of # of 5-minute wake ups until call in. This would = 24 hours.
13. Go to 15.
14. Calculate proper call-in date, based on the recall day # (4= daily, 7 = weekly, 30 = monthly, 90 = quarterly). Store proper values in (NXTC+1) and (NXTC+2).
15. Clear (NXTC+0) # of 2-second intervals until first wake up.
16. Clear (NXTC+3) # of 2-second intervals after last full 5-minute period, until call in.
17. Return to main program.

FLOW CONTROL FOR READING THE GATE ARRAY STATUS FLAGS (This routine is called RAISF)
The flags are: (GASTA) and (GASTA+1) registers
   0,GASTA: lead-line supervision flag
   1,GASTA: timer time-out flag
   2,GASTA: force call-in flag
   3,GASTA: miscellaneous alarm #1 flag
   4,GASTA: miscellaneous alarm #2 flag
   5,GASTA: RAM test call-in flag
   6,GASTA: LSB: # of watchdog time-outs
   7,GASTA: MID SB: # of watchdog time-outs
   0,GAST+1: MSB: # of watchdog time-outs
1. Make the I/O port lines between the gate array and microcomputer inputs to the microcomputer. (DDRA = 00) (0,DDRB = 0) (1,DDRB = 0) (2,DDRB = 0)
2. Set gate array control pins to proper states for reading status flags.
   SELECT = 0 0,PORTC = 0
   READ = 1 1,PORTC = 1
3. Read the data I/O lines for the status flags information: (0-7,PORTA 0,PORTB)
4. Disable read control pin on gate array. READ = 0 1,PORTC = 0
5. Store data from PORTA in GASTA+0 register.
6. Store data from 0,PORTB in 0,GASTA+1 register.
7. Return to main program.

FLOW CONTROL FOR INSTALLATION COMMUNICATIONS PROCEDURE (This routine is called INSTL)
1. Initialize communications registers.
2. Check for carrier (222 SHz) If carrier present, go to 3. If carrier not present, go to 27.
3. Send (transmit) carrier (1270 Hz).
4. Set flag to tell receive routine to calculate a checksum for all bytes received.
5. Receive 25 bytes of data (RECORD #1).
6. Compare the received checksum to the checksum calculated. If =, go to 11. If <22 , go to 7.
7. Set flag to tell receiver to expect RECORD #1 again.
8. Check if 2 tries have been made. If 2 tries already made, go to 26. If < 2 tries made, go to 9.
9. Send (transmit) a NAK ($62) over tip and ring.
10. Go to 4.
11. Clear (reset) receiver control flags.
12. Store data in proper registers.
13. Send (transmit) an ACK ($06) over tip and ring.
14. Set flag to tell receive routine to calculate a checksum for all bytes received.
15. Receive 16 bytes of data (RECORD #2)
16. Compare the received checksum to the checksum calculated. If =, go to 21. If <>, go to 17.
17. Set flag to tell receiver to except RECORD #2 again.
18. Check if 2 tries have been made. If 2 tries already made, go to 26. If < 2 tries made, go to 19.
19. Transmit a ($62) NAK over tip and ring.
20. Go to 14.
21. Clear (RESET) receiver control flags.
22. Store data in proper registers.
23. Transmit an ACK ($06) over tip and ring.
24. Set flag (7,CNG) to indicate a successful installation.
25. Return to main routine.
26. Send a ($62) NAK over tip and ring.
27. Return to main routine.

FLOW CONTROL FOR THE SCHEDULED OR EMERGENCY COMMUNICATIONS ROUTINE

This communications is initiated by the AMR and is a scheduled call-in when the transaction identifier = #$82 and an emergency call-in when the transaction identifier = #$42. (This routine is called SOEC)
1. Increment the # of call-in attempts.
2. Initialize the communications buffer: SCIR,X = SCIR,0.
3. Reset communications flags (CNTRL = 00).
4. Set up port lines.
   A. 4,PORTB =0 AMR unit is on hook.
   B. 5,PORTB = 0 AMR transmitted is squelched.
   C. 6,PORTB = 0 AMR receiver is active. (VC is applied to amplifier 217, FIG. 4)

5. Load the communication buffer with data to be transmitted to the HQ system. The first byte (SCIR+0) = Transaction Identifier (TI).
   If TI = #$42, emergency
   If TI = #$82, scheduled
6. Check if this is the second attempt at transmitting record #1 (2,CNG = 1).
   If second attempt (2,CNG = 1), go to 13.
   If first attempt (2,CNG = 0), go to 7.
7. Bring AMR unit off hook (4,PORTB = 1).
8. Delay for settling of dial tone frequency.
9. Check for dial tone (100 Hz to 800 Hz) (DTDR Routine).
   If dial tone present, go to 10.
   If dial tone absent, go to 50.
10. Dial (pulse dial method) utility phone #.
11. Delay for 2 seconds to allow HQ system to answer the phone and send carrier (2225 Hz).
12. Check for carrier (2025 Hz to 2225 Hz).
   If carrier present, go to 13.
   If carrier absent, go to 50.
13. Transmit carrier (1270 Hz).
14. Send #23 bytes of data (send what was previously stored in SCIR buffer).
15. Delay 0.5 seconds to allow switch for receiving.
16. Receive one byte of data (ACK = #$06, NAK = #$62).
17. If received character = ACK (#$06), go to 22. If received character = NAK (#$62), go to 18.
18. Check if 2 attempts have been made at transmission. If 2 attempts made, go to 50. If 1 attempt made, go to 19.
19. Set flag to indicate this is the second attempt at transmission (2,CNG = 1).
20. Reset the communications buffer.
21. Go to 5.
22. Reset re-transmit flag (2,CNG = 0).
23. Set flag to tell receive to calculate a checksum.
24. Receive 17 bytes of data.
25. Rset (clear) receiver control flags.
26. Compare received checksum to the checksum calculated. If =, go to 31. If <>, go to 27.
27. Set control flag for receiver to except record #2 again from HQ system (4,CNG = 1).
28. Check if 2 tries have been made. If 2 tries already made (2,CNG = 1), go to 49. If < 2 tries made (2,CNG = 0), go to 29.
29. Send (transmit) a NAK ($62) over TIP and ring to HQ system.
30. Go to 23.
31. Reset (clear) record #2 control flags (4,CNG = 0).
32. Reset (clear) re-transmission flag (2,CNG = 0).
33. Store data in proper registers.
34. Send (transmit) an ACK ($06) to HQ system.
35. Check if HQ system want to modify the utility phone #. If 5,STAUS = 1, then go to 36. If 5,STAUS = 0, go to 63.
36. Set control flag for receiver to calculate a checksum (3, CNTRL = 1).
37. Receive 18 bytes of data (record #4).
38. Reset (clear) receiver control flags (3,CNTRL = 0).
39. Compare received checksum to the checksum calculated. If =, fo to 44. If <>, go to 40.
40. Set control flag to tell receiver to except record #4 again from HQ system (5,CNG = 1).
41. Check if 2 tries have been made. If 2 tries already made (2,CNG = 1), go to 49. If < 2 tries made (2, CNG = 0), go to 42.
42. Send (transmit) a NAK ($62) over TIP and ring.
43. Go to 36.
44. Reset (clear) record #4 control flag (5,CNG = 0).
45. Reset (clear) re-transmission flag (2,CNG = 0).
46. Store data in communications buffer in the utility phone # registers.
47. Send (transmit) an ACK ($06) to HQ system.
48. Go to 63.
49. Send (transmit) a NAK ($62).
50. Put AMR on-hook (4,PORTB = 0).
51. Squelch the transmitter (5,PORTB = 0).
52. Check if AMR attempted communication because of a normal time-out. If 3,GASTA+1 = 0, go to 54 (normal). If 3,GASTA+1 = 1, go to 53 (alarm).
53. Return to main routine.
54. Set control flag to designate AMR in retry state.
55. Check if volume overflow occurred (volume mode). If 6,STAUS = 1, go to 56. If 6,STAUS = 0, go to 59.
56. Set up volume retry algorithm.
57. Load the gate array timer.
58. Go to 61.
59. Set up time mode retry algorithm.
60. Load gate array timer.
61. Reset (clear) all communications control flags. CONTRL = 00 CNG = 00
62. Return to main routine.
63. Put phone on-hook (4,PORTB = 0). Squelch transmitter (5,PORTB = 0).
64. Load the gate array time with # of 2-second interval until next wake up.
65. Update previous meter reading. PMR(new) = PMR(old) + CMR(old) CMR(new) =00 00 00
66. Check for a 10-million count overflow in previous meter reading.
67. Check if AMR communications with HQ system was because of a normal time- out. If 3,GASTA+1 + 0, go to 75 normal. If 3,GASTA+1 = 1, go to 68 alarm.
68. Check if the update volume control flag is set. If 3,CTRL = 1, go to 70. If 3,CTRL = 0, go to 69.
69. Check if the AMR is in volume call-in mode. If 3,STAUS = 1, go to 76. If 3,STAUS = 0, go to 80.
70. Check if a miscellaneous #1 alarm caused the update volume. If 2,STAUS+1 = 1, go to 71 (yes). If 2,STAUS+1 = 0, go to 73 (no).
71. Set up volume call-in registers so that the count begins over. The counter is reset to zero.
72. Go to 84.
73. Set up volume call-in registers to adjust for the excess counts, over and above the set call-in volume.
74. Go to 84.
75. Check if unit produced a normall call-in from the mode. If 2,STAUS = 1, go to 83. If 2, STAUS = 0, go to 76.
76. Check if previous call-in mode was time or volume. If 5,PAC = 1, go to 80 (volume). If 5,PAC = 0, go to 77 (time).
77. Set the previous call-mode flag to indicate volume mode (5,PAC = 1).
78. Set up volume mode registers so that the count begins at zero.
79. Go to 84.

80. Check if the volume mode control flag to update volume is set (3,CTRL). If 3,CTRL = 1, go to 81 (yes) (update). If 3,CTRL = 1, go to 84 (no update).
81. Set up volume call-in registers to adjust for the excess counts, over and above the set call-in volume.
82. Go to 84.
83. Set previous call-in mode flag to indicate time mode (5,PAC = 0).
84. Reset registers to proper states.
85. Return to main routine.

FLOW CONTROL FOR THE WAKE-UP ROUTINE

After interrupt line (PIN2) is driven low by the gate array, the microcomputer comes out of the stop mode and jumps to the interrupt vector location $IFFA-$IFFB, but the instruction at the location is to jump to this program called INFL.

1. Disable interrupts.
2. Reset the stack pointer to the bottom of the stack.
3. Check if AMR is in diagnostics mode. If 7,PORTC = 1, go to 66 (run diagnostic). If 7,PORTC = 0, go to 4 (run wake-up procedure).
4. Check if AMR is properly installed. If STUP1 <> AA or STUP0 <> 55, go to 5. If STUP1 = AA and STUP0 = 55go to 7.
5. Unit is not installed, so load gate array timer so wake up is in 1 minute.
6. Go to 18 (prepare stop mode).
7. Read and store the gate array status flags.
8. Check if miscellaneous alarm #1 was the cause for wake up. If 3,GASTA = 1, go to 9 (yes, alarm set). If 3,GASTA = 0, go to 10 (no, alarm reset).
9. Check if miscellaneous alarm #1 has already been handled during this wake up. If 3,PAC = 1, go to 10 (already handled, next alarm). If 3,PAC = 0, go to 20 (not handled, deal with it).
10. Check if miscellaneous alarm #2 was the cause for wake up. If 4,GASTA = 1, go to 11 (yes, alarm set). If 4,GASTA = 0, go to 12 (no, alarm reset) (check next).
11. Check if MISC alarm #2 has already beenf handled during this wake up. If 4,PAC = 1, go to 12 (already handled, check next alarm). If 4,PAC = 0, go to 23 (not handled, service alarm).
12. Check if RAM test alarm was the cause for wake up. If 5,GASTA = 1, go to 13 (yes, alarm set). If 5,GASTA = 0, go to 14 (no, alarm reset) (check next).
13. Check if RAM test alarm has already been handled during this wake up. If 7,PAC = 1, go to 14 (already handled, check next alarm). If 7,PAC = 0, go to 26 (not handled, service alarm).
14. Check if force call alarm was the cause for wake up. If 2,GASTA = 1, go to 15 (yes, alarm set). If 2,GASTA = 0, go to 16 (no, alarm reset) (check next).
15. Check if force call alarm has already been handled during this wake up. If 7,PAC = 1, go to 16 (already handled, check next alarm). If 7,PAC = 0, go to 29 (not handled, service alarm).
16. Check if a gate array timer time-out was the cause for wwake up. If 1,GASTA = 1, go to 17 (yes, time-out occurred). If 1,GASTA = 0, go to 18(no, time-out reset) (go to sleep).
17. Check if a gate array timer time-out has already been handled during this wake up. If 0,PAC = 1, go to 18 (already handled, prepare stop mode). If 0,PAC = 0, go to 32 (not handled, service time-out).
18. Reset previous gate array alarm conditions.
19. Put AMR and microcomputer into the low-power. Go into stop mode (JMP GOTSP).
20. Indicate miscellaneous alarm #1 has occurred by setting the appropriate status flag. 2,STAUS+1 = 1
21. Show miscellaneous alarm #1 is being serviced by setting the appropriate previous alarm condition flag: (3,PAC = 1)
22. Go to 57 (produce emergency call-in).
23. Indicate MISC alarm #2 has occurred by setting the appropriate status flag: (3,STAUS+1 = 1)
24. Show MISC alarm #2 is being serviced by setting the appropriate previous alarm condition flag: (4,PAC = 1)
25. Go to 57 (produce emergency call-in).
26. Indicate RAM call alarm has occurred by setting the appropriate status flag: (1,STAUS+1)
27. Show RAM call alarm is being serviced by setting the appropriate previous alarm condition flag: (7,PAC = 1)
28. Go to 63 (go off-hook and download RAM).
29. Indicate a force call alarm has occurred by setting the appropriate status flag: (0,STAUS+1 = 1)
30. Show force call alarm is being servicedd by setting the appropriate previous alarm condition flag: (7,PAC = 1)
31. Go to 57 (produce emergency call-in). Normal Wake up
32. Show gate array timer time-out is being serviced by setting the appropriate previous alarm condition flag: (0,PAC = 1)
33. Reload the gate array timer.
34. Update the meter totalizer.
35. Check for alarms can only be checked during a wake up. (Alarms stored in appropriate status bits.) NOTE: Lead-line supervision has the further restriction of needing a timer time-out to activate the check of the alarm.
36. Check if volume overflow alarm occurred. If 6,STAUS = 1, go to 45 (overflow occurred). If 6,STAUS = 0, go to 37 (no overflow occurred).
37. Check if a no-usage (freeze) alarm occurred. If 1,STAUS+2 = 1, go to 50 (no-usage alarm). If 1,STAUS+2 = 0, go to 38 (non-alarm condition).
38. Check if MISC #3 alarm or MISC #4 alarm occurred. If 1,STAUS+0 = 1 or 4,STAUS+1 = 1, go to 42 (alarm). If 1,STAUS = 0 and 4,STAUS+1 = 0, go to 39 (no alarm).
39. Check if lead-line supervision alarm occurred. If 4,STAUS = 1, go to 50 (lead line occurred). If 4,STAUS = 0, go to 40 (no lead-line alarm).
40. Check if the counter in the microcomputer has decremented to zero, thus signalling a scheduled call-in. This would mean: NXTC+0 = 00 and NXTC+1 = 00 and NXTC+2 = 00 and NXTC+3 = 00. If 6,CTRL = 1, go to 53 (call-in scheduled). If 6,CTRL = 0, go to 41 (call-in not scheduled).
41. Go to 7: (check G.A. status flags again).
42. Check if the units is on retry (7,CTRL). If 6,CTRL = 1, go to 43 (unit is on retry). If 6,CTRL = 3, go to 50 (unit is not on retry).

43. Check if call-in flag is set (5,CTRL). If 5,CTRL = 1, go to 50 (call-in flag is set). If 5,CTRL = 0, go to 44 (call-in flag is not set).
44. Go to 7: (check G.A. status flags again for alarms).
45. Check if the unit is on retry (7,CTRL). If 7,CTRL = 1, go to 46 (unit is on retry). If 7,CTRL = 0, go to 50 (unit is not on retry).
46. Check if 15 retry attempts have been made. If VLRET = 15, go to 47 (15 retries attempted). If VLRET <> 15, go to 4 50 (15 not attempted).
47. Load microcomputer timer countdown registers so that the next retry attempt is in 1 hour.
48. Check if the hour has elapsed for next retry. If 6,CTRL = 1, go to 50 (hour has elapsed, call). If 6,CTRL = 0, go to 49 (hour hasn't elapsed, dont't call).
49. Go to 7: (check G.A. status flags again for alarms).
50. Make transaction identifier #$42 to indicate this is an alarm (emergency transaction).
51. Jump to the scheduled or emergency COMM routine and communicate with the HQ system.
52. Go to 7: (check G.A. status flag again).
53. Check if a potential leak alarm has occurred. If 2,STAUS+2 = 1, go to 50 (leaking). If 2,STAUS+2 = 0, go to 54 (not leaking).
54. Make transaction identifier an #$82 to indicate this is a normal scheduled call-in.
55. Jump to the scheduled or emergency COMM routine and communicate with the HQ system.
56. Go to 7 ((check G.A. status flags again). Emergency Wake Up
57. Update the meter totalizer from the O.A. to the microcomputer.
58. Check if MISC #1 alarm caused the emergency condition. If 2,STAUS+1 = 1, go to 59 (yes, MISC #1 did). If 2,STAUS+1 = 0, go to 60 (no, MISC #1 did not).
59. Set control flag to have the microcomputer reset the volume increment counter after communications is complete: 3,CTRL 1= 1.
60. Make transaction identifier #$42 to indicate this is an alarm (emergency transaction).
61. Jump to the scheduled or emergency COMM routine and communicate with the HQ system.
62. Go to 7: (check G.A. status flags again).
63. Bring AMR unit off-hook (4,PORTB = 1) 64. Download the entire user block of RAM over TIP and ring. (These are memory locations $50-$EF.)
65. Go to 7: (check G.A. status flags again).
66. Go to the diagnostics routine.

FLOW CONTROL FOR TRANSMITTER

Communication protocol for a 300 BAUD transmission with 1 start bit, 8 data bits, 1 stop bit. A start (space) bit is a logic low (0), which is translated by the gate array into a 1070 Hz frequency. A mark is a logic high (1), which is translated by the gate array into a 1270 Hz frequency. The microcomputer uses the serial communication interface (SCI) for the transmission of data, sending out only a logic high (1) or a logic low (0) at a 300 baud rate to the gate array over PIN 30 on the microcomputer.

1. Get and store the # of bytes to be transmitted. Store in length of record register (LOR).
2. Set up the transmission protocol for: 300 BAUD with: 1 start bit 8 data bits 1 stop bit (Also, no interrupt is to be generated at the completion of sending a byte of data.)
3. Turn on the transmitter. (3,SCCR2 = 1)
4. Unsquelch the transmitter: (5,PORTB = 1)
5. Data was stored in the communications buffer (SCIR), so go to the first byte in the buffer. Reset the X-register (X = 0). SCIR,X = SCIR,0
6. Reset (clear) the calculated checksum: CHESKSM = 00
7. Get data from communications buffer (SCIR) and store it in the transmit buffer (SCDAT).
8. Transmit data.
9. Update the checksum with the data that was just transmitted. (CHECKSUM = CHECKSM+SCDAT)
10. Check if that was the last byte to transmit. If X = LOR, go to 13 (last byte). If X <> LOR, go to 11 (not last byte).
11. Go to next byte of data located in the communications buffer (SCIR) by increasing the value of X by 1.
12. Go to 7: (transmit the next byte).
13. Go to the transmitter control register to see if only an ACK or NAK was sent. If true, no checksum is sent. If false, calculated checksum is transmitted as the final byte. If 0,CTRL = 1, go to 16 (don't send checksum). If 0,CTRL = 0, go to 14 (send checksum).
14. Store the calculated checksum in the transmitter's SCDAT register.
15. Transmit data.
16. Turn off the transmitter.
17. Squelch the transmitter.
18. Clear (reset) the transmitter control status flags.
19. Return to main routine.

It will be understood that modifications and variations may be effected without departing from the spirit and scope of the novel concepts of this invention.

What is claimed is:

1. An automatic meter reader for connection to a metering transducer and for connection to a telephone line to transmit modulated signals to a remote data receiving center, said reader comprising: microcomputer means, a telephone interface for connection to said telephone line and including relay means for establishing an off-hook condition of said telephone line for transmission of modulated signals, interconnecting means connected to said metering transducer, said telephone interface and said microcomputer, said interconnecting means including digital logic circuitry and being arranged to facilitate operations including the register of meter data by said microcomputer, transmission of signals to said interface and operation of said off-hook relay for transmission of signals from said interface to said telephone line, said microcomputer means being arranged to control development of said modulated signals from registered meter data and transmission thereof from said interconnecting means and through said telephone interface to said telephone line for reporting of registered meter data to said center, said interconnecting means including terminal means for connection to said metering transducer to receive metering pulse signals each representing a certain quantity, and said digital logic circuitry including metering pulse counter means, debounce means coupled to said terminal means and arranged for applying a pulse to said metering pulse counter means from each received metering pulse signal which has at least a certain amplitude and at least a certain duration, and means for transfer of data from said pulse counter means to said microcomputer means, said terminal means being connectable through lead line conductors to signal means of said transducer and to a fixed resistance at said metering transducer and including a signal terminal connected to said debounce means and through a first one of said lead line conductors to said signal means, a supervision terminal for connection through a second one of said lead line conductors to one end of said fixed resistance and a ground terminal for connection through a third one of said lead line conductors to an opposite end of said fixed resistance, and said interconnecting means including line supervision means including resistance measuring means for developing an output corresponding to the resistance between said supervision and ground terminals.

2. An automatic meter reader for connection to a metering transducer and for connection to a telephone line to transmit modulated signals to a remote data receiving center, said reader comprising: microcomputer means, a telephone interface for connection to said telephone line and including relay means for establishing an off-hook condition of said telephone line for transmission of modulated signals, interconnecting means connected to said metering transducer, said telephone interface and said microcomputer, said interconnecting means including digital logic circuitry and being arranged to facilitate operations including the register of meter data by said microcomputer, transmission of signals to said interface and operation of said off-hook relay for transmission of signals from said interface to said telephone line, said microcomputer means being arranged to control development of said modulated signals from registered meter data and transmission thereof from said interconnecting means and through said telephone interface to said telephone line for reporting of registered meter data to said center, arranged to receive carrier and modulated signals from said center through said telephone line with said relay means in said off-hook condition, said microcomputer means being arranged to sample said received signals to detect a carrier signal and to then effect demodulation of received modulated signals to develop control data therefrom.

3. An automatic meter reader for connection to a metering transducer and for connection to a telephone line to transmit modulated signals to a remote data receiving center, said reader comprising: microcomputer means, a telephone interface for connection to said telephone line and including relay means for establishing an off-hook condition of said telephone line for transmission of modulated signals, interconnecting means connected to said metering transducer, said telephone interface and said microcomputer, said interconnecting means including digital logic circuitry and being arranged to facilitate operations including the register of meter data by said microcomputer, transmission of signals to said interface and operation of said off-hook relay for transmission of signals from said interface to said telephone line, said microcomputer means being arranged to control development of said modulated signals from registered meter data and transmission thereof from said interconnecting means and through said telephone interface to said telephone line for reporting of registered meter data to said center, said reader being arranged to receive modulated signals from said center through said telephone line with said relay means in said off-hook condition, said microcomputer means being arranged to effect demodulation of received modulated signals to develop control data therefrom, and said microcomputer means in effecting said demodulation being arranged to effect at least one sample of said received signal for determination of its frequency.

4. A reader as defined in claim 3, including oscillator means for supplying a clock signal to said microcomputer means for operation thereof, said sample being effected by counting count intervals each having a duration proportional to the duration of one cycle of said clock signal and to obtain from the sample a resultant sample count proportional to the duration of one cycle of said received signal.

5. A reader as defined in claim 4, wherein said received modulated signal is a signal having a frequency shifted between two frequencies which represent marks and spaces, said microcomputer means being arranged to compare said resultant sample count with at least one reference number for determination of whether a mark or a space is received.

6. A reader as defined in claim 3, said interconnecting means including signal processing means for processing an AC signal received by said telephone interface from said telephone line and arranged to apply to said microcomputer means a signal having state changes corresponding to zero crossings of said AC signal.

7. A reader as defined in claim 6, including battery operated voltage supply means for supplying an opeerting voltage for said microcomputer means and said signal processing means, said signal processing meanss comprising amplifier means operating at high gain to produce an output signal with rapid shifts at zero crossings of said received signal between voltages nearly equal to zero and to said operating voltage supplied to said signal processing means.

8. A reader as defined in claim 7, wherein said signal processing means further comprises a Schmitt trigger circuit responsive to said amplifier output signal for applying a signal to said microcomputer means to be demodulated thereby.

9. An automatic meter reader for connection to a metering transducer and for connection to a telephone line to transmit modulated signals to a remote data receiving center, said reader comprising: microcomputer means, a telephone interface for connection to said telephone line and including relay means for establishing an off-hook condition of said telephone line for transmission of modulated signals, interconnecting means connected to said metering transducer, said telephone interface and said microcomputer, said interconnecting means including digital logic circuitry and being arranged to facilitate operations including the register of meter data by said microcomputer, transmission of signals to said interface and operation of said off-hook relay for transmission of signals from said interface to said telephone line, said microcomputer means being arranged to control development of said modulated signals from registered meter data and transmission thereof from said interconnecting means and through said telephone interface to said telephone line for reporting of registered meter data to said center, said reader further comprising high frequency oscillator means, frequency shift keying means operable by said microcomputer means including down-counter means operable from signal supplied by said high frequency oscillator means an arranged for selective operation under control of said microcomputer means at two different count-down ratios to develop mark and space signals of different frequencies for transmission over said telephone line to report registered meter data.

10. A reader as defined in claim 9, for serial transmission of data bytes with each byte being formed by a series of bit signals and with each bit signal being a signal at either a mark frequency or a space frequency and having a certain duration, said frequency shift keying means being operated under control of said microcomputer means to control the duration and frequency of each bit signal.

11. An automatic meter reader for connection to a metering transducer and for connection to a telephone line to transmit modulated signals to a remote data receiving center, said reader comprising: microcomputer means, a telephone interface for connection to said telephone line and including relay means for establishing an off-hook condition of said telephone line for transmission of modulated signals, interconnecting means connected to said metering transducer, said telephone interface and said microcomputer, said interconnecting means including digital logic circuitry and being arranged to facilitate operations including the register of meter data by said microcomputer, transmission of signals to said interface and operation of said off-hook relay for transmission of signals from said interface to said telephone line, said microcomputer means being arranged to control development of said modulated signals from registered meter data and transmission thereof from said interconnecting means and through said telephone interface to said telephone line for reporting of registered meter data to said center, said reader further including battery operated voltage supply means for supplying an operating voltage for said microcomputer means, said interconnecting means including circuitry which is continuously energized from said voltage supply means, and which includes data signal receiving means and wake-up timer means, said data signal receiving means being arranged for receiving signals from said metering transducer, said wake-up timer means being arranged to be reset and to thereafter develop a wake-up signal, said microcomputer means including a memory and being connected to said voltage supply means for continuous energization of said memory thereof and for performance of processing operations when in a wake-up condition, and wake-up means responsive to said wake-up signal to change said microcomputer means from an inactive sleep condition to an active wake condition for performance of said processing operations, said processing operations including accumulation of data from said data signal receiving means and storage of corresponding accumulated data in aid memoru followed by a final power-down to said sleep condition.

12. A reader as defined in claim 11, wherein said wake-up means includes oscillator means controlled by said continuously engergized circuitry and arranged for supplying a clock signal to said microcomputer means.

13. A reader as defined in claim 11, wherein said microcomputer means includes wake-up register means in said memory for registering a count of wake-up operations, said processing operations including a determination of the count of said wake-up register means and in response to a certain count the control of operation of said telephone interface and the development and transmission of modulated signals to said center to report stored accummulated meter data.

14. A reader as defined in claim 11, said interconnecting means including terminal means for connection to said metering transducer to receive metering pulse signals each representing a certain quantity, and said digital logic circuitry including metering pulse counter means, debounce means coupled to said terminal means and arranged for applying a pulse to said metering pulse counter means from each received metering pulse signal which has at least a certain amplitude and at least a certain duration, and means for transfer of data from said pulse counter means to said microcomputer means.

15. A reader as defined in claim 11, said interconnecting means including terminal means for connection to said metering transducer to receive metering signals, said terminal means being connectable through lead line conductors to signal means of said transducer and to a fixed resistance at said metering transducer, and lead line supervision means operative to measure the resistance presented at said terminal means through said fixed resistance and lead line conductors in series therewith, said lead line supervision means being controlled by said wake-up means to be operative only periodically for short time intervals.

16. A reader as defined in claim 15, said terminal means including a signal terminal connected to said data signal receiving means and through a first one of said lead line conductors to said signal means of said transducer, a supervision terminal for connection through a second one of said lead line conductors to one end of said resistance and a ground terminal for connection through a third one of said lead line conductors to an opposite end of said resistance, and said line supervision means including resistance measuring means for developing an output corresponding to the resistance between said supervision and ground terminals.

17. A device for connection to a telephone line for receiving carrier and modulated signals from a control center, said device comprising: microcomputer means, a telephone interface for connection to said telephone line, interconnecting means connected to said telephone interface and to said microcomputer means for receipt by said microcomputer means of received carrier and modulated signals transmitted from said center, said microcomputer means being arranged to detect receipt of a carrier signal and to operate in response to detection of receipt of a carrier signal to effect demodulation of said modulated signals received through said telephone line and said interface from said center and to develop control data therefrom, said microcomputer means in detecting a carrier signal and in effecting said demodulation being arranged to effect samples of said received signal for determination of its frequency, each of said sample being effected by detecting changes of state of a received signal and determining the duration of one full square wave of the received signal.

18. A device for connection to a telephone line for receiving modulated signals from a control center, said device comprising: microcomputer means, a telephone interface for connection to said telephone line, interconnecting means connected to said telephone interface and to said microcomputer means for receipt by said microcomputer means of said modulated signals transmitted from said center, said microcomputer means being arranged to effect demodulation of said modulated signals received through said telephone line and said interface from said center and to develop control data therefrom, said microcomputer means in effecting said demodulation being arranged to effect at least one sample of said received signal for determination of its frequency, said device further including oscillator means for supplying a clock signal to said microcomputer means for operation thereof, and said sample being effected by counting clock intervals each having a duration proportional to the duration of one cycle of said clock signal and to obtain from the sample a resultant sample count proportional to the duration of one cycle of said received signal.

19. A device as defined in claim 18, further comprising signal processing means for processing a AC signal received by said telephone interface from said telephone line and arranged to apply to said microcomputer means a signal having state changes corresponding to zero crossings of said AC signal, said microcprocessor means being arranged to respond to an initial change of state of said signal to initiate counting of said clock intervals and to respond to a subsequent change of state of said signal to terminate counting of said clock intervals and to provide said resultant count proportional to the duration of one cycle of said signal.

20. A device as defined in claim 19, wherein said count of clock intervals is terminated in response to a second change of state following said initial change of state whereby said sample corresponds to counting of clock intervals during a full cycle of said received signal.

21. A device as defined in claim 18, wherein said received modulated signal is a signal having a frequency shifted between two frequencies which represent marks and spaces, said microcomputer means being arranged to compare said resultant count of a sample with at least one reference count which corresponds to a frequency intermediate said two frequencies for determination of whether a mark or a space is received.

22. A device as defined in claim 21, wherein said received modulated signal is in the form of serial trains of signals with the signals in each train having predetermined durations and each having either a mark-representing frequency or a space-representing frequency, said microprocessor processor means being arranged to operate during the duration of each signal to perform a pluraiity of samples to develop a plurality of said resultant counts.

23. A device as defined in claim 18, said microcomputer means being arranged to compare said resultant count of a sample with at least one reference frequency for determination of whether the frequency of said received signal is within a certain range of frequencies.

24. A device as defined in claim 18, said microcomputer means being arranged to compare said resultant count of a sample with two reference signals for determination of whether the frequency of said received signal lies between said two reference frequencies.

25. A device for connection to a telephone line for receiving modulated signals from a control center, said device comprising: microcomputer means, a telephone interface for connection to said telephone line, interconnecting means connected to said telephone interface and to said microcomputer means for receipt by said microcomputer means of said modulated signals transmitted from said center, said microcomputer means being arranged to effect demodulation of said modulated signals received through said telephone line and said interface from said center and to develop control data therefrom, said microcomputer means in effecting said demodulation being arranged to effect at least one sample of said received signal for determination of its frequency, said device further comprising signal processing means for processing a AC signal received by said telephone interface from said telephone line and arranged to apply to said microcomputer means a signal having state changes corresponding to zero crossings of said AC signal.

26. A device as defined in claim 25 including a battery operated voltage supply means for supplying an operating voltage for said microcomputer means and said signal processing means, said signal processing meanss comprising amplifier means operating at high gain to produce an output signal with rapid shifts at zero corssings of said received signal between voltages which are nearly equal to zero and to said operating voltage supplied to said signal processing means.

27. A device as defined in claim 26, wherein said signal processing means further comprises a Schmitt trigger circuit responsive to said amplifier output signal for applying a signal to said microcomputer means to be demodulated thereby.

28. A devive for connection to a telephone line for transmitting modulated signals to a control center to report data, said device comprising: a telephone interface for connection to said telephone line, microcomputer means, interconnecting means connected to said telephone interface and said microcomputer, said interconnecting means including digital logic circuitry and being arranged to facilitate operations including the transmission of signals to said interface, said microcomputer means being arranged to control development of said modulated signals from data to be reported and transmission thereof from said interconnecting means and through said telephone interface to said telephone line for reporting of data to said center.

29. A device as defined in claim 28, comprising high frequency oscillator means, frequency shift keying means operable by said microcomputer means including down-counter means operable from signals supplied by said high frequency oscillator means and arranged for selective operation under control of said microcomputer means at two different count-down ratios to develop mark and space signals of different frequencies for transmission over said telephone line to report data.

30. A device as defined in claim 29, for serial transmission of data bytes with each byte being formed by a series of bit signals and with each bit signal being a signal at either a mark frequency or a space frequency and having a certain duration, said frequency shift keying means being operated under control of said microcomputer means to control the duration and frequency of each bit signal.

31. A device as defined in claim 29, said down-counter means being formed by digital circuitry separate from said microcomputer means.

32. A device as defined in claim 28, including battery operated voltage supply means for supplying an operating voltage for said microcomputer means, said interconnecting means including circuitry which is continuously energized from said voltage supply means, and which includes data signal receiving means and wake-up timer means, said wake-up timer means being arranged to be reset and to thereafter develop a wake-up signal, said microcomputer means including a memory and being connected to said voltage supply means for continuous energization of said memory thereof and for performance of processing operations when in a wake-up condition, and wake-up means responsive to said wake-up signal to change said microcomputer means from an inactive sleep condition to an active wake condition for performance of said processing operations, said processing operations including accumulation of data from said data signal receiving means and storage of corresponding accumulated data in said memory followed by a final power-down to said sleep condition.

33. A device as defined in claim 32, wherein said microcomputer means includes wake-up register means in said memory for registering a count of wake-up operations, said processing operations including a determination of the count of said wake-up register means and in response to a certain count the control of operation of said telephone interface and the development and transmission of modulated signals to said center to report data.

34. An automatic meter reader including terminal means for connection through lead line conductors to signal means of a metering transcducer and to a resistance at said metering transducer, said terminal means including a signal terminal connected through a first one of said lead line conductors to said signal means, a supervision terminal for connection through a second one of said lead line conductors to one end of said fixed resistance and a ground terminal for connection through a third one of said lead line conductors to an opposite end of said fixed resistance, and said interconnecting means including line supervision means including resistance measuring means for developing an output corresponding to the resistance between said supervision and ground terminals.

35. An automatic meter reader including terminals for connection through lead line conductors to signal means of a metering transducer and to a fixed resistance at said metering transducer, and signal receiving means and line supervision means connected to said terminals, said line supervision means including resistance measuring means for periodically measuring the resistance presented at said terminals from said fixed resistance and conductors said lead line in series therewith, said resistance measuring means including capacitance means connected to said terminals to be connected in circuit with said fixed resistance and being operable through measurement of a change of charge of said capacitance means.

36. A reader as defined in claim 35, wherein said resistance measuring means comprises means for placing said capacitance means in an initial charge condition and for change of its charge with time as a function of the resistance of said fixed resistance and the resistance of lead line conductors in series therewith, and measurement means for measuring the change of charge of said capacitance means as a function of time.

37. A reader as defined in claim 35, wherein said measurement means is arranged for developing an output signal when the change of charge of said capacitance means as a function of time is either below or above a certain acceptable range.

38. A reader as defined in claim 37, wherein said measurement means includes counter means, means for initiating application of clock pulses to said counter means in synchronism with the placing of ssaid capacitance means in said initial charge condition, and means for comparing the times of changes of charge of said capacitance means to certain levels with the count of clock pulses by said counter means.

* * * * *